US012647065B2

(12) United States Patent (10) Patent No.: US 12,647,065 B2
Ito (45) Date of Patent: Jun. 2, 2026

(54) SYSTEM FOR ADJUSTMENT OF A SOLAR PANEL

(71) Applicant: Softbank Group Corp., Tokyo (JP)

(72) Inventor: Kaoru Ito, Tokyo (JP)

(73) Assignee: Softbank Group Corp., Tokyo (JP)

( * ) Notice: Subject to any disclaimer, the term of this patent is extended or adjusted under 35 U.S.C. 154(b) by 0 days.

(21) Appl. No.: 19/317,225

(22) Filed: Sep. 3, 2025

(65) Prior Publication Data

US 2026/0066837 A1 Mar. 5, 2026

(51) Int. Cl.
*H02S 20/30* (2014.01)
*G01W 1/02* (2006.01)
(52) U.S. Cl.
CPC .............. *H02S 20/30* (2014.12); *G01W 1/02* (2013.01)
(58) Field of Classification Search
CPC .................................. H02S 20/30; H02S 20/32
See application file for complete search history.

(56) References Cited

U.S. PATENT DOCUMENTS

| | | | | |
|---|---|---|---|---|
| 2017/0146287 A1* | 5/2017 | Rezayat | .................. | F25D 13/00 |
| 2020/0036325 A1* | 1/2020 | Poivet | ..................... | H02S 30/20 |
| 2023/0378903 A1* | 11/2023 | Choudhury | ............. | H02S 20/20 |
| 2024/0035284 A1* | 2/2024 | Flann | ...................... | E04F 10/08 |

FOREIGN PATENT DOCUMENTS

| | | | |
|---|---|---|---|
| CN | 117411349 | * | 1/2024 |
| JP | 2022-180282 A | | 12/2022 |

* cited by examiner

*Primary Examiner* — Jayne L Mershon
(74) *Attorney, Agent, or Firm* — Banner & Witcoff, Ltd.

(57) ABSTRACT

A system includes a processor that measures an angle of the sun, measures a light intensity, acquires weather information, measures a wind speed, receives data obtained from the foregoing measurements and acquisitions, analyzes the data, generates a control command to optimally adjust an orientation, angle, and area of a solar panel based on a result of analyzing the data, and physically adjusts the solar panel based on the control command.

6 Claims, 14 Drawing Sheets

SYSTEM FOR ADJUSTMENT OF A SOLAR PANEL

CROSS-REFERENCE TO RELATED APPLICATION

This application is based on and claims priority under 35 USC 119 from Japanese Patent Application No. 2024-153524 filed on Sep. 5, 2024, which is incorporated by reference herein in its entirety.

BACKGROUND

Technical Field

The present disclosure relates to a system.

Related Art

Japanese Patent Application Laid-Open (JP-A) No. 2022-180282 discloses a persona chatbot control method executed by at least one processor. The method includes steps of: receiving a user utterance, adding the user utterance to a prompt including a description of a chatbot character and an associated instruction sentence, encoding the prompt, and inputting the encoded prompt to a language model to generate a chatbot utterance responding to the user utterance.

Conventional solar power generation systems generally rely on static or manually adjustable solar panels, which often fail to maximize power generation efficiency under varying environmental conditions. Furthermore, such systems may be vulnerable to damage under adverse weather situations, such as strong winds or heavy snowfall, due to the lack of an intelligent protection mechanism. There is therefore a need for a solar power generation system that can dynamically and optimally control the orientation, angle, and area of solar panels in real time, while also maintaining safety and durability of the equipment under fluctuating environmental factors.

SUMMARY

In order to solve the above problem, the present invention provides a system comprising a processor that: measures the angle of the sun, light intensity, weather information, and wind speed; receives and analyzes data from these measurements and acquisitions; generates a control command to optimally adjust the orientation, angle, and area of a solar panel based on the analysis result; and physically adjusts the solar panel accordingly. The processor further uses an AI analysis module to calculate the optimal orientation, angle, and area of the solar panel. Moreover, in response to detected strong wind or snowfall, the processor generates a protection command to move the solar panel to a horizontal or vertical position, respectively, thereby improving both the efficiency and safety of solar power generation.

"Processor" means a computing device or circuitry configured to execute operations such as calculation, analysis, and control in the system.

"Angle of the sun" means a positional value or measurement indicating the sun's altitude and azimuth relative to the horizon at a specific geographic location and time.

"Light intensity" means a quantitative measure of the amount of sunlight received per unit area by the solar panel, usually expressed in units of lux or watts per square meter.

"Weather information" means data describing environmental conditions at the installation site, including but not limited to temperature, precipitation, cloud coverage, and atmospheric phenomena such as rain or snowfall.

"Wind speed" means the rate at which air is moving at the site of the solar panel installation, typically measured in meters per second.

"Solar panel" means a device or array consisting of photovoltaic cells capable of converting sunlight into electrical energy.

"Orientation" means the directional alignment or azimuth of the solar panel with respect to true north.

"Angle" means the tilt or inclination of the solar panel relative to the horizontal plane.

"Area" means the effective or exposed surface area of the solar panel that is adjusted and available for sunlight collection.

"Control command" means an instruction generated by the processor to adjust the orientation, angle, or area of the solar panel.

"Protection command" means a special instruction generated by the processor to move the solar panel into a position that prevents or minimizes damage from adverse weather conditions, such as strong wind or snowfall.

"AI analysis module" means a software or hardware-implemented unit utilizing artificial intelligence algorithms to analyze data and determine optimal control actions for the solar panel.

BRIEF DESCRIPTION OF THE DRAWINGS

Exemplary embodiments of the present disclosure will be described in detail based on the following figures, wherein.

DETAILED DESCRIPTION

Figure 1:
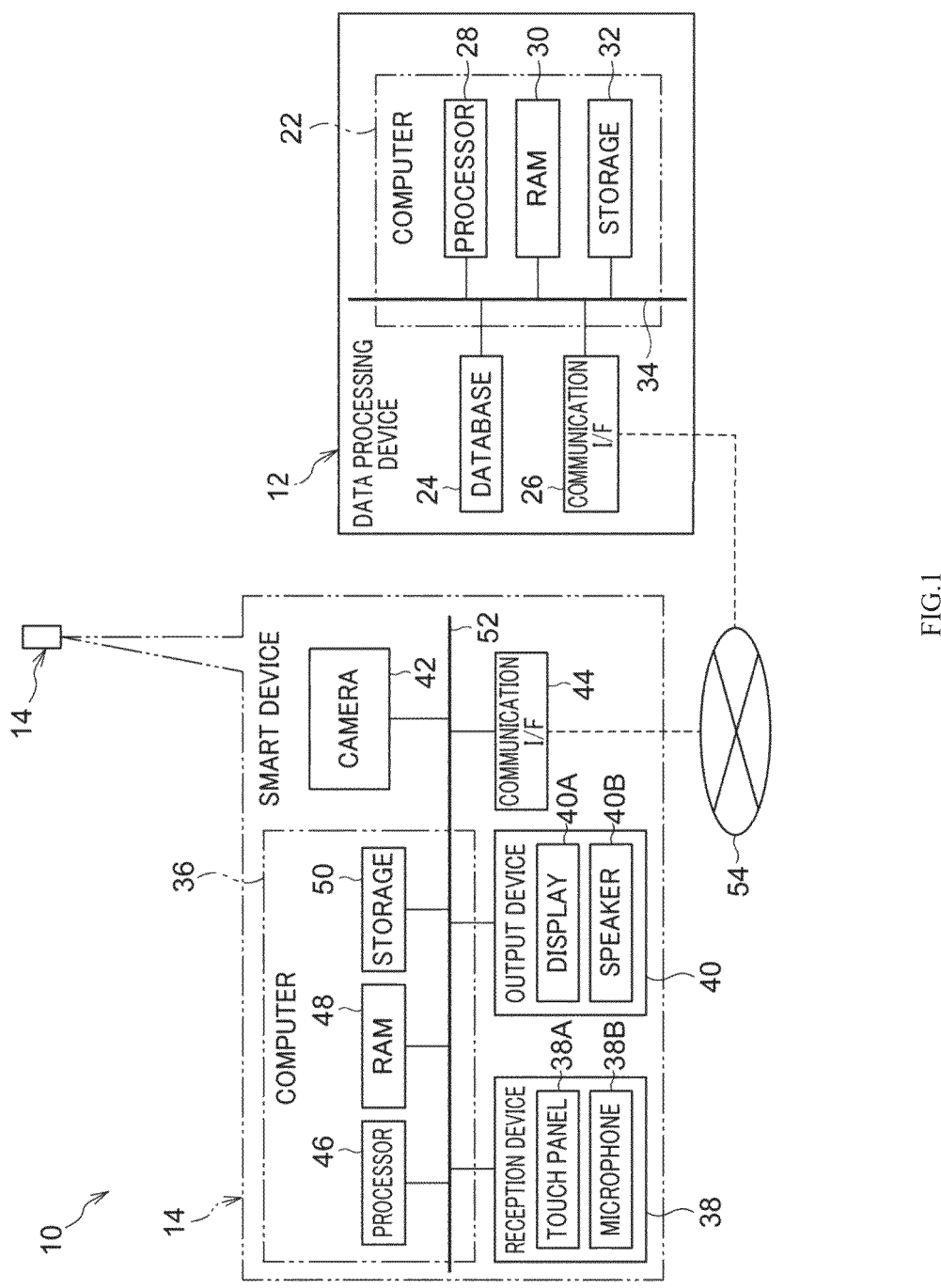
FIG. 1 is a schematic diagram illustrating an example of a configuration of a data processing system according to a first exemplary embodiment.

Description follows regarding an example of exemplary embodiments of a system according to technology disclosed herein, with reference to the appended drawings.

First, explanation follows regarding terminology employed in the following description.

In the following exemplary embodiments, a reference-numeral-appended processor (hereinafter simply referred to as "processor") may be implemented by a single computation unit, and may be implemented by a combination of plural computation units. The processor may be implemented by a single type of computation unit, or may be implemented by a combination of plural types of computation units. Examples of computation unit include a central processing unit (CPU), a graphics processing unit (GPU), a general-purpose computing on graphics processing units (GPGPU), an accelerated processing unit (APU), and the like.

In the following exemplary embodiments, random access memory (RAM) appended with a reference numeral is memory temporarily stored with information, and is employed as working memory by a processor.

In the following exemplary embodiments, reference-numeral-appended storage is a single or plural non-volatile storage devices for storing various programs and various parameters and the like. Examples of non-volatile storage devices include flash memory (such as a solid state drive (SSD)), a magnetic disk (for example, a hard disk), magnetic tape, and the like.

In the following exemplary embodiments, a reference-numeral-appended communication interface (I/F) is an interface including a communication processor and an antenna or the like. The communication I/F has the role of communicating between plural computers. An example of a communication standard applied for the communication I/F is a wireless communication standard, such as a Fifth Generation Mobile Communication System (5G), Wi-Fi (registered trademark), Bluetooth (registered trademark), and the like.

In the following exemplary embodiments "A and/or B" has the same definition as "at least one out of A or B". Namely, "A and/or B" may mean A alone, may mean B alone, or may mean a combination of A and B. Moreover, similar logic to "A and/or B" is applied when "and/or" is employed to link three or more items in the present specification.

First Exemplary Embodiment

FIG. 1 illustrates an example of a configuration of a data processing system 10 according to a first exemplary embodiment.

As illustrated in FIG. 1, the data processing system 10 includes a data processing device 12 and a smart device 14. A server is an example of the data processing device 12.

The data processing device 12 includes a computer 22, a database 24, and a communication I/F 26. The computer 22 is an example of a "computer" according to technology disclosed herein. The computer 22 includes a processor 28, RAM 30, and storage 32. The processor 28, the RAM 30, and the storage 32 are connected to a bus 34. The database 24 and the communication I/F 26 are also connected to the bus 34. The communication I/F 26 is connected to a network 54. Examples of the network 54 include a Wide Area Network (WAN) and/or a local area network (LAN).

The smart device 14 includes a computer 36, a reception device 38, an output device 40, a camera 42, and a communication I/F 44. The computer 36 includes a processor 46, RAM 48, and storage 50. The processor 46, the RAM 48, and the storage 50 are connected to a bus 52. The reception device 38, the output device 40, the camera 42, and the communication I/F 44 are also connected to the bus 52.

The reception device 38 includes a touch panel 38A, a microphone 38B, and the like for receiving user input. The touch panel 38A receives user input from contact of a pointer (for example, a pen, a finger, or the like) by detecting contact of the pointer. The microphone 38B receives spoken user input by detecting speech of the user. A control unit 46A in the processor 46 transmits data representing the user input received by the touch panel 38A and the microphone 38B to the data processing device 12. A specific processing unit 290 in the data processing device 12 acquires the data indicating the user input.

The output device 40 includes a display 40A, a speaker 40B, and the like for presenting data to a user 20 by outputting the data in an expression format perceivable by the user 20 (for example, audio and/or text). The display 40A displays visual information such as text, images, or the like under instruction from the processor 46. The speaker 40B outputs audio under instruction from the processor 46. The camera 42 is a compact digital camera installed with an optical system such as a lens, an aperture, a shutter, and the like, and with an imaging device such as a complementary metal-oxide semiconductor (CMOS) image sensor or a charge coupled device (CCD) image sensor or the like.

The communication I/F 44 is connected to the network 54. The communication I/F 44 and the communication I/F 26 perform the role of exchanging various information between the processor 46 and the processor 28 over the network 54.

Figure 2:
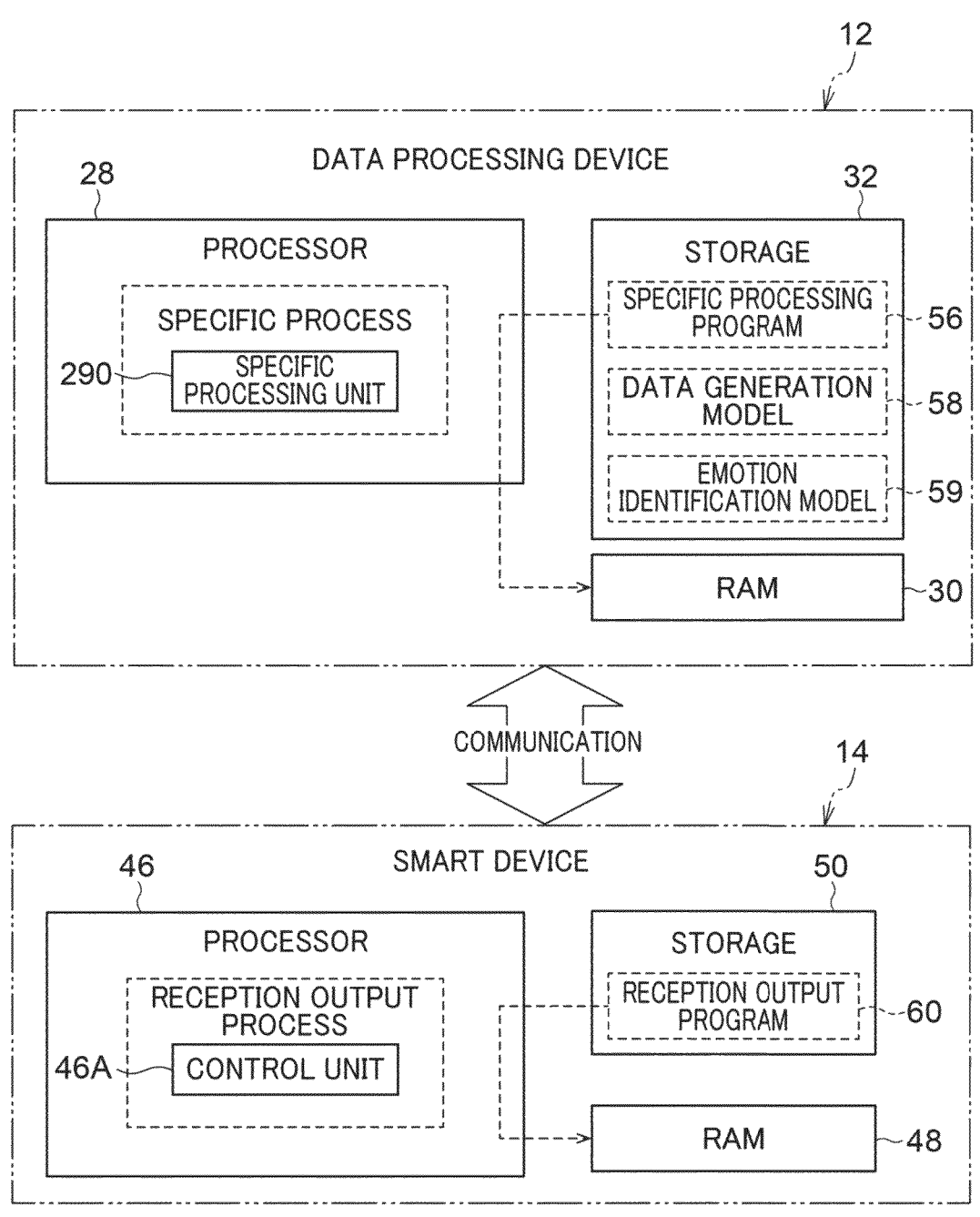
FIG. 2 is a schematic diagram illustrating an example of relevant functions of a data processing device and a smart device according to the first exemplary embodiment.

FIG. 2 illustrates an example of relevant functions of the data processing device 12 and the smart device 14.

As illustrated in FIG. 2, specific processing is performed by the processor 28 in the data processing device 12. A specific processing program 56 is stored in the storage 32.

The specific processing program 56 is an example of a "program" according to technology disclosed herein. The processor 28 reads the specific processing program 56 from the storage 32, and in the RAM 30 executes the read specific processing program 56. The specific processing is implemented by the processor 28 operating as the specific processing unit 290 according to the specific processing program 56 executed in the RAM 30.

A data generation model 58 and an emotion identification model 59 are stored in the storage 32. The data generation model 58 and the emotion identification model 59 are employed by the specific processing unit 290. The specific processing unit 290 uses the emotion identification model 59 to estimate an emotion of a user, and is able to perform the specific processing using the user emotion. In an emotion estimation function (emotion identification function) that uses the emotion identification model 59, various estimations, predictions, and the like are performed related to emotions of the user, include estimating and predicting the emotion of the user, however, there is no limitation to such examples. Moreover, estimation and prediction of emotion also includes, for example, analyzing (parsing) emotions and the like.

Reception and output processing is performed by the processor 46 in the smart device 14. A reception and output program 60 is stored in the storage 50. The reception and output program 60 is employed by the data processing system 10 in combination with the specific processing program 56. The processor 46 reads the reception and output program 60 from the storage 50, and in the RAM 48 executes the read reception and output program 60. The reception and output processing is implemented by the processor 46 operating as the control unit 46A according to the reception and output program 60 executed in the RAM 48. Note that a configuration may be adopted in which a similar data generation model and emotion identification model to the data generation model 58 and the emotion identification model 59 are included in the smart device 14, and these models are used to perform similar processing to the specific processing unit 290. The reception and output program is implemented by the processor 46 operating as the control unit 46A according to the reception and output program 60 executed in the RAM 48.

Note that devices other than the data processing device 12 may include the data generation model 58. For example, a server device (for example, a generation server) may include the data generation model 58. In such cases, the data processing device 12 performs communication with the server device including the data generation model 58 to obtain a processing result (prediction result or the like) obtained using the data generation model 58. The data processing device 12 may be a server device, and may be a terminal device owned by the user (for example, a mobile phone, a robot, a home electrical appliance, or the like). Next, description follows regarding an example of processing by the data processing system 10 according to the first exemplary embodiment.

Example 1

Description follows regarding a flow of the specific processing in an Example 1. The units of the system described below are implemented by the data processing device 12 and the smart device 14. The data processing device 12 is called a "server" and the smart device 14 is called a "terminal".

Conventional solar power generation systems require manual adjustment of photovoltaic panels based on environmental conditions, such as sunlight, weather, and wind speed, which results in reduced efficiency and increased risk of damage during severe weather events. Additionally, existing systems lack timely and automated notification mechanisms for users when abnormalities occur, making rapid response difficult and potentially resulting in equipment damage or diminished generation performance.

The specific processing by the specific processing unit 290 of the data processing device 12 in Example 1 is realized by the following means.

The present invention provides a server comprising a processor configured to receive solar position information, radiation intensity information, weather information, and airflow velocity information from various sensors, store the information set in a storage medium, analyze the information set using an information processing device with a machine learning or deep learning analytical model, generate control instructions for optimally adjusting the physical structure of a power generation apparatus based on the analysis results, activate a driving unit to realize the adjustment, and monitor operational status to notify a user via a communication medium upon detection of abnormalities. This enables automated and optimized real-time adjustment of photovoltaic panels for improved efficiency and safety, and further enables prompt user notification of abnormal events for rapid response.

The term "processor" refers to an electronic data processing unit or circuit configured to execute instructions, process data, and control operations of the system.

The term "solar position information" refers to data representing the location or angle of the sun relative to the surface of the earth or a solar panel at a given time, including parameters such as azimuth and elevation.

The term "radiation intensity information" refers to data indicating the magnitude or strength of solar irradiance, measured as the amount of solar energy received per unit area.

The term "weather information" refers to data characterizing atmospheric conditions, including temperature, humidity, precipitation, cloud cover, and weather phenomena such as rain, snow, or fog.

The term "airflow velocity information" refers to data indicating the speed and direction of air movement, typically measured as wind speed, at the site of the power generation apparatus.

The term "information set" refers to a collection of data acquired from multiple sensors or sources, comprising solar position information, radiation intensity information, weather information, and airflow velocity information.

The term "storage medium" refers to any physical or virtual memory device or digital storage mechanism capable of retaining data, such as hard drives, solid-state drives, memory chips, or cloud-based storage.

The term "information processing device" refers to a computing apparatus or system configured to perform specific processing functions, such as data analysis, optimization, or control command generation.

The term "analytical model" refers to a computational structure or algorithm, including machine learning or deep learning models, used to analyze input data and output optimal control or prediction results.

The term "physical structure of a power generation apparatus" refers to a mechanical assembly or arrangement within a solar power system, including photovoltaic panels and their supporting structures, whose physical position or orientation may be adjusted.

The term "control instruction" refers to a set of data or signals generated by the processor, specifying changes to be made to the physical structure of the power generation apparatus for optimization or protection.

The term "driving unit" refers to an actuator or motor assembly capable of moving or adjusting the physical structure of the power generation apparatus in response to received control instructions.

The term "operational status" refers to the current condition or state information regarding the functionality or performance of the power generation apparatus, including normal operation and any detected abnormalities.

The term "communication medium" refers to any channel or system for transmitting information between the server and the user, such as wired or wireless networks, email, SMS, push notifications, or alarm systems.

The term "user" refers to an operator, administrator, or other individual who receives notifications or information from the system and may take action based on such communications.

The term "abnormality" refers to any irregular condition, malfunction, deviation from expected values, or detected fault in the operation of the power generation apparatus or components thereof.

The term "protection instruction" refers to a command generated to move the physical structure of the power generation apparatus to a safety position when predetermined environmental criteria, such as excessive wind or adverse weather, are detected.

The term "safety position" refers to a predetermined orientation or arrangement of the physical structure of the power generation apparatus designed to minimize risk of damage or maximize protection during unfavorable environmental conditions.

Embodiment for Implementing the Invention

The invention is implemented as a smart solar power generation system that autonomously adjusts the physical configuration of a photovoltaic installation based on real-time environmental data, using a combination of sensing devices, digital processing hardware, AI-enabled analytics software, and automated actuation mechanisms.

The system comprises a server (as the core processor), one or more terminals (as sensor and actuator interfaces), and a user who interacts with the system primarily through notifications. The server is typically realized as a general-purpose computer or a cloud instance equipped with central and/or graphics processing units, running an operating system such as Linux, and executing data processing software developed in a language such as Python or Node.js. The terminals are typically microcontroller-based devices such as those built with single-board computers or embedded controllers, equipped with wireless communication modules using standards such as WiFi or LTE.

To acquire the necessary environmental data, the terminal is equipped with sensing devices including an optical sensor (for example, an angle sensor), a photodiode (for example, a light intensity sensor), an anemometer (for example, a wind speed sensor), and a facility for obtaining weather information such as a weather API interface or local weather sensing assembly. The terminal continuously collects environmental data such as solar position, radiation intensity, airflow velocity, and weather information, and transmits this data on a scheduled basis to the server over a network using protocols such as MQTT or HTTP.

The server receives the aggregated sensor data, verifies its integrity, and stores it in a digital storage medium such as a relational database (for example, MySQL) or a NoSQL database (for example, MongoDB). For data analysis, the server utilizes an information processing device with machine learning and deep learning models implemented using software frameworks such as TensorFlow or PyTorch. The server applies these models to the information set, using both real-time and historical data, to calculate optimal control instructions for the orientation, tilt, and configuration of the photovoltaic structures, and to detect potential environmental threats.

Upon generating a control instruction, the server transmits the instruction to the terminal using the above-mentioned communication protocols. The terminal receives the instruction, decodes it, and drives actuators such as servo motors or motorized mounts to adjust the physical structure of the solar panels accordingly. For example, if severe wind conditions are detected, the system may generate a command to move all panels to a horizontal position to minimize damage risk.

The server also performs continuous monitoring of the operational status by collecting feedback from the sensors installed on the photovoltaic structure. If the system detects an abnormality (such as a deviation from expected panel angle or failure in actuation), the server generates and sends a notification to the user via a communication medium such as email, SMS, or a push notification service. Notification services may be implemented using third-party platforms such as SMTP servers, SMS gateways, or cloud messaging solutions.

For example, suppose the terminal detects a wind speed of 15 meters per second at noon. The terminal sends this data, along with other sensor data, to the server. The server stores the data, analyzes it with the AI model using TensorFlow, determines that the panels should be moved for protection, generates the corresponding control instruction, and sends it to the terminal. The terminal actuates the motors to move the panels horizontally, and the server monitors status feedback. If the panel movement is not successfully completed or another abnormality is detected, the user receives a real-time notification.

An example prompt sentence for a generative AI model, to explain the system's operation under specific conditions, is as follows:

"Describe step-by-step how the AI smart solar power system will operate at 12:00 PM when the terminal measures a wind speed of 15 m/s. Include the actions of the terminal, the server, and the user."

This embodiment enables automatic, data-driven, and highly responsive management of photovoltaic power generation systems, contributing to both efficiency improvement and enhanced safety.

Figure 11:
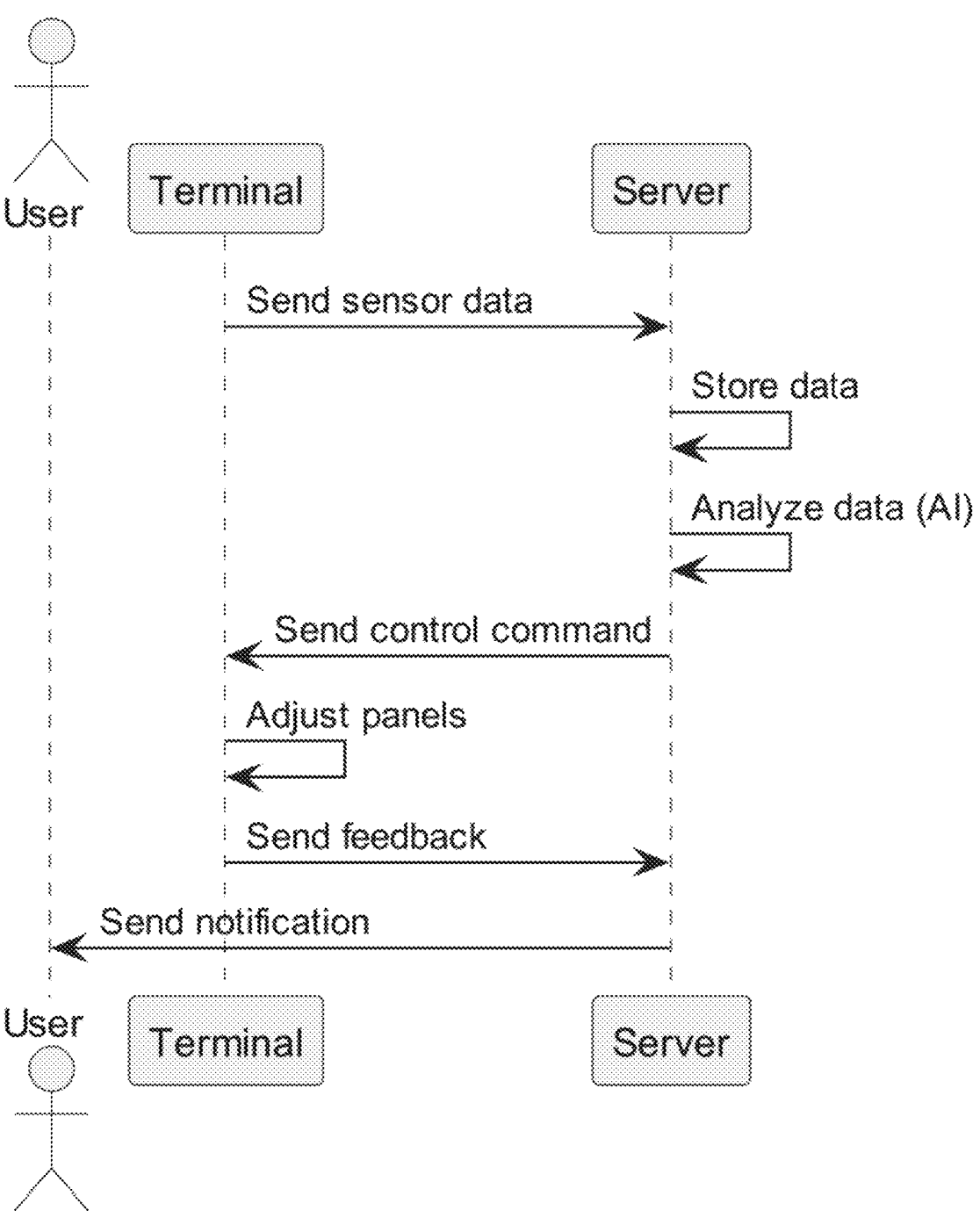
FIG. 11 is a sequence diagram showing the flow of data processing system processing in Example 1.

The following describes the processing flow using FIG. 11.

Step 1:

The terminal collects environmental data by activating sensors, such as an optical sensor for solar position, a photodiode for radiation intensity, an anemometer for airflow velocity, and a weather data acquisition method. The input consists of real-world environmental conditions. The terminal converts these physical measurements into digital data, packages them with a timestamp, and structures the data as a JSON object. The output is a formatted data packet containing the latest environmental readings.

Step 2:

The terminal transmits the packaged data to the server using a communication protocol, such as MQTT or HTTP. The input is the structured data packet generated in Step 1. The terminal performs the operation of establishing network communication and sending the data to a specific server endpoint. The output is successful delivery of environmental data to the server.

Step 3:

The server receives the data transmitted from the terminal. The input is the data packet containing environmental measurements. The server parses the packet, verifies data integrity, and stores the processed information into a digital storage medium such as a relational or NoSQL database, for example, MySQL or MongoDB. The output is a consistent, queryable data record available for analysis.

Step 4:

The server retrieves the latest and, optionally, historical data from the database. The input is the stored environmental data. The server performs data preprocessing, such as normalization and feature extraction, then inputs the data into an AI analytics module implemented using a framework like TensorFlow or PyTorch. The server runs prediction or optimization algorithms to determine the optimal orientation or safety configuration for the solar panels. The output is a set of control instructions with recommended position and actuation values.

Step 5:

The server generates a control instruction for the terminal based on the results from the AI analytics module or rule-based logic. The input is the optimized actuation values from Step 4. The server encodes these instructions in a suitable format, such as JSON, and logs the instruction for system traceability. The output is a ready-to-send actuation instruction.

Step 6:

The server transmits the control instruction to the terminal using the established communication protocol. The input is the encoded control instruction. The server processes and queues the instruction to the target terminal, confirming successful delivery. The output is the control instruction received by the terminal.

Step 7:

The terminal receives the control instruction from the server. The input is the actuation command specifying new panel positions or safety modes. The terminal decodes the command and drives the actuator mechanism, such as servo motors, to physically adjust the orientation or tilt of the solar panels as instructed. The output is a solar panel arrangement that reflects the new configuration.

Step 8:

The terminal collects post-adjustment feedback from panel-mounted sensors, including confirmation of position and system diagnostics. The input is the physical state of the panels after movement. The terminal formats this information as a feedback packet and transmits it to the server. The output is a status update sent to the server.

Step 9:

The server receives and analyzes the feedback data to verify correct actuation or detect abnormalities, such as incomplete movement or system faults. The input is the post-actuation state data. The server compares reported values to the target configuration and diagnoses any irregularities. If an abnormality is detected, the output is a notification triggered for the user; otherwise, the process is logged as completed successfully.

Step 10:

The server sends a notification to the user in case of detected abnormal conditions or upon execution of significant automated actions (such as moving panels for safety). The input is the diagnostic outcome from Step 9. The server formats a notification message, selects an appropriate medium (such as email, SMS, or push notification), and sends the message to the user's device. The output is the delivery of relevant operational information or warning to the user.

Step 11:

The user receives the notification regarding system status, incidents, or successful operations. The input is the communication from the server. The user may review the system alert or status update and, if necessary, take manual action to inspect, repair, or override system functions. The output is potentially improved situational awareness and system safety.

Application Example 1

Description follows regarding a flow of the specific processing in an Application Example 1. The units of the system described below are implemented by the data processing device 12 and the smart device 14. The data processing device 12 is called a "server" and the smart device 14 is called a "terminal".

In conventional power generation systems utilizing energy sources such as solar panels, it is difficult to achieve efficient and safe operation due to the lack of real-time and intelligent data analysis for optimizing the orientation and operational parameters of the generation elements. Furthermore, these systems do not provide effective means for real-time anomaly detection, adaptive control during adverse environmental conditions, or user-centric operation based on user emotion or manual input. As a result, the generation efficiency may decrease, the risk of damage increases during abnormal weather, and user satisfaction is often compromised due to insufficient feedback or unresponsive control.

The specific processing by the specific processing unit 290 of the data processing device 12 in Application Example 1 is realized by the following means.

The present invention provides a server comprising a processor configured to aggregate and preprocess measurement data of the energy source angle, radiation intensity, environmental state, and airflow velocity, analyze the data using an artificial intelligence module, generate control information for adjusting the orientation and surface area of a power generation element based on the results of this analysis and the user's emotional state, automatically execute drive control, notify external terminals of the state or abnormalities, and accept user input for manual control. This enables highly efficient and safe automatic operation of the energy generation system, proactive disaster prevention and protection during abnormal weather, and enhanced user satisfaction by incorporating real-time system feedback and emotion-adaptive user interfaces.

The term "processor" refers to an electronic computing unit that executes instructions and performs logical, control, and arithmetic operations necessary for system functions.

The term "information acquisition device" refers to any sensor or apparatus capable of obtaining measurement data, including but not limited to energy source angle sensors, radiation intensity sensors, environmental state sensors, and airflow velocity sensors.

The term "energy source" refers to a source of renewable or non-renewable energy, such as solar radiation, that can be harnessed for power generation.

The term "angle" refers to the measured orientation or inclination of an energy source relative to a reference direction or plane.

The term "radiation intensity" refers to the quantitative measurement of energy emitted from the energy source per unit area, typically expressed in watts per square meter.

The term "environmental state" refers to the aggregated representation of external conditions, including but not limited to weather, temperature, humidity, and precipitation.

The term "airflow velocity" refers to the speed at which air is moving past a given location, measured by suitable airflow or wind sensors.

The term "data aggregation and preprocessing" refers to the collecting, integrating, cleansing, and correcting of measurement data, including handling of missing or abnormal values prior to system analysis.

The term "artificial intelligence analysis module" refers to a software or hardware-based component that performs advanced data analysis and prediction using machine learning or neural network algorithms.

The term "user state evaluation module" refers to a subsystem that analyzes user-related input, such as expressions or voice, to estimate the emotional state or intention of the user.

The term "control information" refers to command or instruction data generated for the purpose of adjusting physical components of the system, such as orientation or surface area of the power generation element.

The term "power generation element" refers to any component or module within the system that physically converts received energy into electrical power, such as a solar panel.

The term "drive device" refers to a mechanical or electromechanical unit, such as a motor or actuator, that physically manipulates a component of the power generation element in response to control information.

The term "external electronic device or information terminal" refers to any hardware device operated by a user for interfacing with the system, including user terminals such as smart glasses, smartphones, and computers.

The term "user input" refers to any command, signal, or feedback provided by the user via the information terminal to manually affect the operation of the power generation element.

The term "user emotion estimation information" refers to data output produced by analyzing user expressions or voice to infer the emotional state of the user.

The term "visual or audio notification" refers to a form of alert communicated to the user through a display or sound-generating device to provide system status or anomaly information.

The term "protection control information" refers to instruction data generated to set the power generation element to a safety configuration in response to predetermined environmental or operational risks.

An embodiment for implementing the present invention is described as follows.

The system of this invention includes a server, one or more terminals, a plurality of information acquisition or sensing devices, drive devices, user terminals, and associated software modules. The system is configured to optimize the operation of a power generation element, such as a photovoltaic panel, by utilizing real-time environmental data, user feedback, and artificial intelligence-based data analysis. Hardware and software components interact to enable automated, adaptive, and user-responsive control and monitoring.

The server centrally manages and executes core processes of the system. Specifically, the server is equipped with a processor which aggregates and preprocesses measurement data received from distributed information acquisition devices. These devices can include but are not limited to solar angle sensors, irradiance (light intensity) sensors, environmental sensors measuring parameters such as temperature or precipitation, and airflow velocity sensors. The server may utilize data communication protocols such as MQTT or HTTP REST for receiving and integrating sensor streams in real time.

Collected measurement data is subjected to preprocessing-such as validation, normalization, and correction of missing or abnormal data-using processing libraries such as Python Pandas, with all data being stored in a database such as PostgreSQL. The server may also receive user-related input, including facial expression data or voice data, acquired via a camera or microphone associated with a user terminal (for example, smart glasses or a smartphone).

The server executes an artificial intelligence analysis module, which may be implemented in Python using frameworks such as TensorFlow or Keras. This module processes environmental and user data by feeding it through a trained machine learning or neural network model. The model infers the optimal orientation, tilt, and surface area of the power generation element, factoring in real-time sensor data and the estimated emotional state of the user. The user state evaluation module analyzes user facial expressions or voice—using, for example, OpenCV for image analysis or a speech emotion recognition library—to generate user emotion estimation information.

Based on analysis results, the server generates control information for adjusting the physical state of the power generation element. This control information specifies, for instance, angles, tilt, area, timing, or protective configurations to be applied under adverse environmental states. The server may then transmit these instructions to a terminal device, which interprets and actuates drive devices such as servo motors or actuators. The terminal ensures physical adjustment of the solar panel or equivalent component as commanded.

Upon execution, the server monitors the status feedback from each terminal and records operating states and anomalies. In the event of abnormal operation—such as mechanical jam, over-speed, or environmental hazards—the server notifies the user by sending a visual or audio alert through the user terminal. Notifications may use push mechanisms or in-app alerts for devices such as smartphones or smart glasses.

The user is enabled to monitor system status on the user terminal in real time. If desired, the user can override system commands or control the power generation element manually through voice commands or touch gestures. User input is received by the server and validated against safety protocols; if appropriate, the server issues new control instructions to the terminal for execution.

Throughout operation, the server adaptively adjusts behavior of the system. For example, if the user is detected as stressed, the server may reduce notification frequency or delay non-critical panel movement. In another case, during an oncoming storm, the server may immediately place the panels in a predefined protection configuration, regardless of user status, to enhance system safety.

A concrete system example: On a summer afternoon, the server aggregates current sun angle, irradiance, humidity, and wind speed data. The artificial intelligence module computes the optimal panel tilt and orientation. The server checks the user's current emotional state via smart glasses; if the user is calm, panel adjustments proceed immediately. If strong wind is detected, the server overrides with a protection command, placing the panels flat to avoid damage, and sends a visual alert to the user's smart device. The user, seeing the notification, can issue a voice or gesture command using the smart glasses to request resumption of normal operation once conditions are safe.

Exemplary prompt sentence for generative AI model:

Based on the following smart solar system description, create a smart glasses application prototype that acquires real-time solar and user emotion data via sensors and the emotion engine, displays system and warning information, and allows manual override of panel control via voice or gestures.

Figure 12:
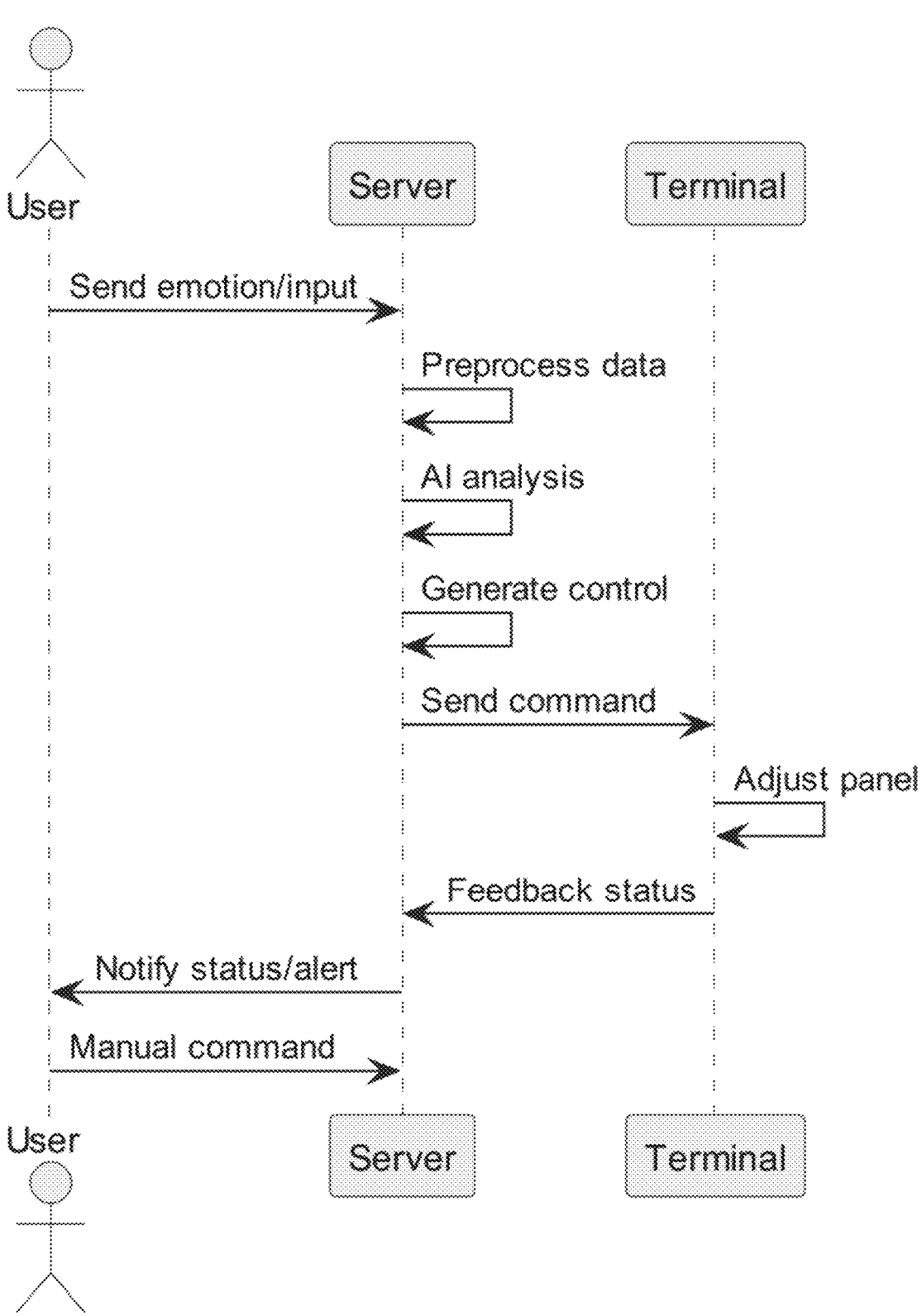
FIG. 12 is a sequence diagram showing the flow of data processing system processing in Application Example 1.

The following describes the processing flow using FIG. 12.

Step 1:

The server receives real-time measurement data from multiple information acquisition devices including energy source angle sensors, radiation intensity sensors, environmental state sensors, airflow velocity sensors, and user terminals equipped with cameras and microphones. The input consists of raw sensor data (e.g., sun angle, light intensity, temperature, humidity, wind speed) and user-related data (facial images, voice signals). The server stores the collected data in a database. The output is a structured dataset containing the latest readings from all sensors and user input modules.

Step 2:

The server performs data preprocessing by validating, cleaning, and normalizing the received dataset. For example, the server detects and compensates for missing values in wind speed using the last known reliable value, and flags any outliers for further inspection. The user facial and voice data are preprocessed-images are resized and sound signals are filtered for noise. The input for this step is the raw, multimodal data from Step 1; the output is a clean, normalized dataset ready for analysis.

Step 3:

The server analyzes the preprocessed dataset using an artificial intelligence analysis module implemented with machine learning libraries. The server inputs environmental data and user data into a neural network model, which computes predictions for optimal physical state settings (orientation, tilt, area) of the power generation element, and determines the user's emotional state. The output is a set of recommended control parameters and a real-time user emotion estimation.

Step 4:

The server generates control information based on the AI analysis results, combining panel configuration instructions and timing. If the user is detected as anxious, the server may include a delay or gentle notification in the control information. If adverse environmental states are detected, such as high wind, emergency protection commands are appended. The input is analysis data from Step 3 and real-time user state; the output is a formatted control instruction to be delivered to the terminal.

Step 5:

The terminal receives the control instruction from the server and interprets the operational parameters (target angles, tilt, area, and timing) contained therein. The terminal sends voltage and position signals to relevant drive devices—such as servo motors or actuators attached to the power generation element—to physically adjust panel orientation and configuration as commanded. The input is the server's control instruction; the output is the new physical configuration of the power generation element as confirmed by internal position sensors.

Step 6:

The server monitors feedback data sent from the terminal, including position feedback from actuators, current panel state, error codes, and device health reports. The input is live status feedback from the terminal and its devices. The server logs all system events and, in the case of anomalies—such as actuator failure or an unachieved panel position—creates an error alert. The output is a system status update, logged records, and, when applicable, an alert message.

Step 7:

The server communicates current system status and alerts to the user's information terminal by sending visual and/or audio notifications. For example, the server may display "Panels moved to safe position due to strong wind" on a smart glasses display and play a warning tone. The input is panel and system status, or alert information from Step 6; the output is real-time status and alert notifications visible or audible to the user.

Step 8:

The user interacts with the system by monitoring notifications and issuing commands as needed. The user can provide voice input, such as "Resume maximum output mode," or use touch gestures on the smart terminal to request manual adjustment. The input in this step is user-initiated commands or feedback (voice, gesture, selection); the output is a command or request to the server for re-evaluation.

Step 9:

The server receives, interprets, and validates user override commands from the information terminal. Based on safety logic and current environmental and system status, the server may accept, modify, or deny the user's command. If approved, the server generates and sends corresponding control instructions to the terminal for execution. The input is user command along with real-time system and safety data; the output is an updated control instruction or a user feedback message indicating command acceptance or denial.

It is also possible to incorporate an emotion engine for estimating the user's emotions. That is, the specific processing unit 290 may estimate the user's emotions using an emotion identification model 59, and perform specific processing based on the estimated emotions.

Example 2

Description follows regarding a flow of the specific processing in an Example 2. The units of the system described below are implemented by the data processing device 12 and the smart device 14. The data processing device 12 is called a "server" and the smart device 14 is called a "terminal".

Conventional solar power generation systems primarily focus on maximizing efficiency based only on solar irradiation and panel angles, often neglecting user satisfaction and safety, especially under severe weather conditions such as strong wind or heavy snowfall. Furthermore, such conventional systems do not consider the user's emotional state in their control or notification processes, which can lead to decreased user comfort and increased system-related stress. There is a need for a system capable of optimizing solar power generation by integrating environmental conditions, operational safety, and user well-being through advanced data analysis and adaptive control.

The specific processing by the specific processing unit 290 of the data processing device 12 in Example 2 is realized by the following means.

The present invention provides a server comprising a processor configured to obtain environmental and user status information, preprocess and analyze said information using a machine learning model, generate optimized control instructions for solar power system components based on both environmental conditions and user status, physically execute control of the solar power system components, continuously monitor the system status, and automatically notify the user and adapt notification content and timing based on the user's emotional state. This enables enhanced safety and efficiency in solar power generation while improving user comfort and satisfaction, even under adverse weather conditions or when the user is in a high-stress state.

The term "processor" refers to an electronic data processing unit capable of executing programmed instructions to perform data acquisition, analysis, and control operations within the system.

The term "information acquisition unit" refers to a device or module configured to obtain specific types of information, including solar position, solar radiation, meteorological conditions, gas flow velocity, and user status.

The term "solar position information" refers to data related to the location and angle of the sun as observed from the installation site of the power generation device.

The term "solar radiation information" refers to data representing the intensity or amount of solar energy incident upon the surface of the power generation device.

The term "meteorological information" refers to data regarding ambient environmental conditions, such as temperature, humidity, precipitation, atmospheric pressure, and cloud coverage.

The term "gas flow velocity information" refers to data indicating the speed of moving gas, typically wind velocity, in the environment surrounding the power generation device.

The term "user status information" refers to data acquired regarding the physical or psychological state of a user, including but not limited to emotional or stress levels derived from biometric or behavioral analysis.

The term "preprocessing" refers to data treatment procedures that prepare raw information for analysis, including but not limited to normalization, error correction, and interpolation of missing values.

The term "information analysis unit" refers to a module or algorithm, which may include a machine learning model, that analyzes preprocessed data to compute optimized operational parameters for the power generation device.

The term "optimization information" refers to the calculated set of operational parameters or directives determined to enhance the efficiency, safety, or user satisfaction in the operation of the power generation device.

The term "control instructions" refers to electronic signals or commands generated to guide the operation or adjustment of components in the power generation device.

The term "power generation device component" refers to any mechanical or electronic part of the solar power generation system, including solar panels and their actuators, whose operation may be controlled or adjusted.

The term "physically adjust" refers to the act of changing the position, orientation, or state of a power generation device component by mechanical means according to control instructions.

The term "monitor" refers to the continuous or periodic observation and assessment of the operational status of the power generation device component.

The term "abnormality" refers to any condition or operational state of the system that deviates from expected performance parameters or indicates potential failure or risk.

The term "notify" refers to the action of alerting or informing the user regarding the operational status of the system, including abnormalities, through communication means such as messages, alarms, or notifications.

One embodiment for implementing the invention is described as follows.

The server is equipped with a processor and functions as the central management and analysis unit for a solar power generation system. The processor is connected to multiple information acquisition units, including sensors for obtaining solar position information (such as a digital solar angle sensor), solar radiation information (such as a pyranometer), meteorological information (such as a weather sensor capable of detecting temperature, humidity, and precipitation), gas flow velocity information (such as an anemometer), and user status information (obtained by a camera and microphone integrated into a terminal device). The user interacts with the system primarily via the terminal, which is configured with a camera and microphone and can acquire user status information such as emotional state using emotion recognition software.

The processor receives data from all information acquisition units through a secure communication protocol, for example, by using HTTPS or MQTT. The server preprocesses the collected data by normalizing, filling missing values, and performing error detection, employing data manipulation software such as Python scripts using the Pandas library. The server stores the preprocessed data in a time-series database, such as InfluxDB, to facilitate further analysis.

For data analysis, the server uses an information analysis unit, which includes a machine learning model implemented on a generic machine learning framework such as PyTorch or TensorFlow. The information analysis unit processes both environmental data (collected from solar, radiation, weather, and flow velocity sensors) and user status data (from facial and voice emotion recognition modules, such as those built with Affectiva SDK or generic open-source frameworks). The server calculates optimized operational parameters, such as panel tilt, orientation, or area exposure, by applying optimization algorithms based on real-time conditions. The system integrates user status into the optimization process, for example, by modifying movement patterns or notification timing when the system detects the user is under stress.

Once the optimal operational parameters are determined, the server generates control instructions, typically in the form of structured data such as JSON, and transmits them over the network to the terminal. The terminal, which acts as an actuator control unit, is typically built using a general-purpose embedded computer (such as a single-board computer) and a microcontroller (such as a programmable logic controller or Arduino). The terminal receives the control instruction and converts it into hardware-specific commands to drive the actuators attached to the power generation device components (such as solar panels). This is commonly accomplished using GPIO, serial communication, and standard hardware control libraries.

Throughout operation, the server continuously monitors the state of the power generation device by receiving periodic status updates from the terminal, including panel position, current output, and diagnostic information. In the event of an abnormality or risk (such as high wind speed or hardware malfunction), the server notifies the user. Notification is performed over a network, for example by using push notifications delivered through a mobile application or by email. The notification content and timing can automatically adapt to the user's emotional state, aiming to reduce unnecessary stress.

A specific example is as follows: At noon, the terminal measures a wind speed of 15 m/s and detects user stress through emotion analysis software. This data is sent to the server, which executes a machine learning-based optimization. As a result, the processor instructs the terminal to move the solar panels to a horizontal position to ensure protection. Simultaneously, the server adapts the notification content, such as providing a calming message to the user, and delays non-urgent alerts.

An example of a prompt sentence suitable for input to a generative AI model to analyze this operation is:

"Describe, step by step, how the AI smart solar power generation system collects environmental and emotion data, analyzes those data on the server, generates appropriate panel movement commands, executes them on the terminal hardware, and notifies the user, especially in the case where strong wind and high user stress are both detected."

Figure 13:
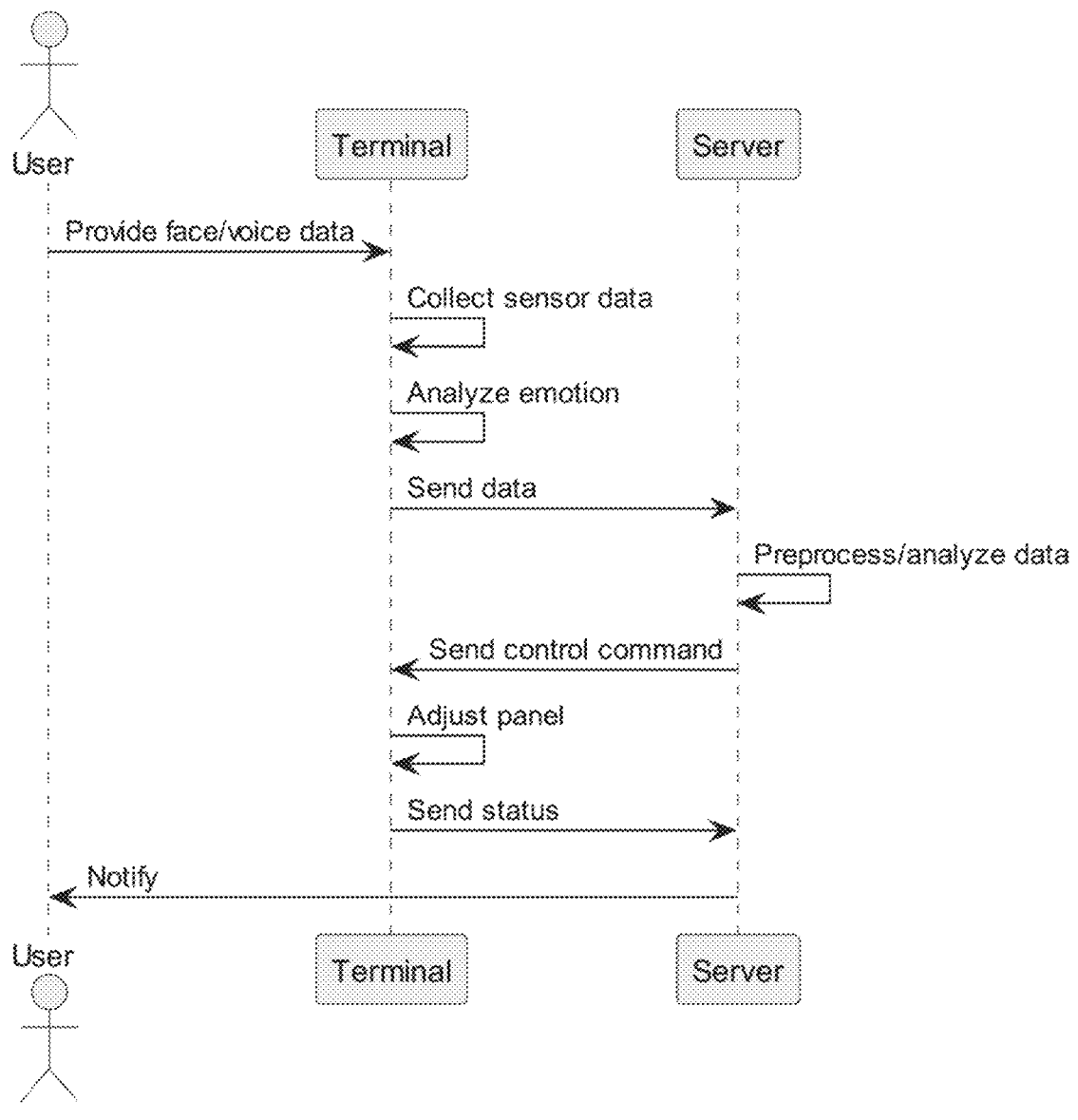
FIG. 13 is a sequence diagram showing the flow of data processing system processing in Example 2; and 3                                                                                          4

The following describes the processing flow using FIG. 13.

Step 1:

The terminal collects environmental sensor data, including solar position, solar radiation, weather, and gas flow velocity, at regular intervals. The terminal also captures facial images and voice recordings from the user through a built-in camera and microphone. As input, the terminal receives raw sensor readings and user biometric information. The terminal processes this input using drivers and preliminary filtering, and outputs the digitized sensor data and user status data.

Step 2:

The terminal analyzes the captured facial and voice data using an emotion recognition program to determine the user's emotional state, such as stress or comfort. The input for this step is the biometric data acquired in Step 1. The terminal runs an emotion detection algorithm and outputs a user status value representing emotional indicators.

Step 3:

The terminal transmits the consolidated environmental data and user status data to the server over a secure communication protocol such as HTTPS or MQTT. The input is the processed environmental and user status data generated in Steps 1 and 2. The terminal executes data packaging and secure transmission, and outputs packets delivered to the server.

Step 4:

The server receives the data packet and aggregates the environmental data and user status data from all connected terminals. The input is the transmitted environmental and emotional data. The server performs data preprocessing, such as normalization, gap-filling, and error correction using data science libraries. The output is a standardized and cleaned dataset ready for deeper analysis.

Step 5:

The server analyzes the preprocessed data using a machine learning model, such as one built on a general-purpose machine learning framework. The input is the cleaned, aggregated dataset from Step 4. The server runs inference to determine optimal panel parameters, considering both environmental conditions and user emotional state, and outputs a set of optimized control commands.

Step 6:

The server generates a control instruction, such as the required angle and orientation for the panel, and transmits this instruction to the terminal. The input is the set of optimized control commands output from Step 5. The server encapsulates commands into a network message and outputs a structured control message delivered to the terminal.

Step 7:

The terminal receives the control message and parses the instruction. The input is the structured control message from Step 6. The terminal forwards panel movement commands to a microcontroller, which then physically actuates the position, tilt, or state of the power generation device components. The output is physical adjustment of the solar panels and a status update confirming execution.

Step 8:

The terminal monitors and confirms the final state of the adjusted panels using position sensors or encoders. The terminal assembles a status report, including completion confirmation and any detected anomalies. The input for this step is sensory feedback from the hardware. The terminal processes the input and outputs a status report sent to the server.

Step 9:

The server receives the status report and compares the actual result to the intended state. If an abnormality is detected or if environmental danger is present, the server prepares a user notification. The input is the status report from the terminal. The server processes this by evaluating against normal operation thresholds and outputs a user-specific notification.

Step 10:

The user receives the notification via mobile application or email. The input is the notification provided by the server. The user reviews the notification and, if needed, can take further action such as checking physical equipment or interacting with the application dashboard. The output is user action or acknowledgment based on the content of the notification.

Application Example 2

Description follows regarding a flow of the specific processing in an Application Example 2. The units of the system described below are implemented by the data processing device 12 and the smart device 14. The data processing device 12 is called a "server" and the smart device 14 is called a "terminal".

Conventional energy management systems for facilities such as logistics centers primarily focus on optimizing the efficiency of power generation or consumption based solely on environmental data, and do not consider comprehensive integration with dynamic energy consumption patterns or the emotional states and wellbeing of employees. This results in suboptimal use of energy resources and potential negative impacts on operational stability and workforce satisfaction, especially under fluctuating environmental or internal conditions. Therefore, there is a need for a system capable of optimizing not only energy management, but also work environment and employee wellbeing, by leveraging real-time multidimensional data and advanced analytical techniques.

The specific processing by the specific processing unit 290 of the data processing device 12 in Application Example 2 is realized by the following means.

The present invention provides a server comprising a processor configured to acquire environmental information, facility energy consumption information, and subject emotional state information from a plurality of distributed sensors and detection devices; to integrate and preprocess said information; to analyze the preprocessed information using a machine learning model for determination of optimal configuration of power generation apparatus elements, energy consumption patterns, and work environment elements; to generate and transmit control information to automatically adjust the power generation apparatus and facility equipment based on the analysis; and to monitor operational states and issue alerts when abnormal conditions are detected. This enables real-time and integrated optimization of both facility energy efficiency and employee working environment, while allowing prompt response to anomalies and ensuring stable and safe facility operations.

The term "processor" refers to an electronic data processing device configured to execute instructions and perform data analysis, control, and management operations within a system.

The term "information acquisition device" refers to a hardware component or subsystem, such as a sensor or measurement unit, designed to collect specific types of environmental, operational, or physiological data.

The term "solar position information" refers to data representing the current angle, orientation, or position of the sun relative to a geographic location, typically used to optimize solar energy collection.

The term "radiant light intensity information" refers to data indicating the amount of electromagnetic radiation in the form of light present at a location, which can be measured by optical sensors.

The term "meteorological condition information" refers to data describing the prevailing atmospheric conditions, including parameters such as temperature, humidity, precipitation, and weather events like rain or snow.

The term "atmospheric flow velocity information" refers to data representing the speed and direction of the movement of air, commonly known as wind speed and direction.

The term "facility internal power consumption information" refers to real-time or historical data quantifying the amount of electrical energy used by equipment and systems within a facility.

The term "subject emotional state" refers to the psychological or affective condition of a person or persons within a facility, as detected through physiological signals, facial expressions, or vocal parameters.

The term "motion detection device" refers to a sensing apparatus, such as a camera or movement sensor, designed to detect and interpret movement or posture for further analysis.

The term "acoustic acquisition device" refers to an audio sensor, such as a microphone, used to capture sounds or vocalizations for subsequent processing.

The term "machine learning model" refers to a computational algorithm or neural network that is trained to analyze data patterns and generate predictions or classifications to support system optimization.

The term "power generation apparatus element" refers to a configuration-adjustable component of a renewable energy generation system, such as a solar panel, capable of having its position or operation controlled.

The term "work environment element" refers to any component of a facility that can affect the working conditions and comfort of employees, including but not limited to lighting, temperature, or air quality controls.

The term "control information" refers to data or commands generated by the processor, based on analytical results, to regulate or adjust the settings of equipment or apparatus in the system.

The term "facility equipment" refers to the machinery and devices that constitute the operational infrastructure of a building, such as lighting, HVAC systems, and energy management components.

The term "alert" refers to a notification or warning, automatically issued by the system, to inform users or administrators of detected abnormal or unsafe conditions.

In order to implement the present invention, a system is constructed in which a server is connected to a plurality of information acquisition devices, motion detection devices, and acoustic acquisition devices installed within a facility, such as a logistics center. The server comprises a processor configured to integrate, preprocess, analyze, and generate control information based on the data collected from these devices.

The hardware used includes, but is not limited to, solar angle sensors, optical sensors for measuring light intensity, meteorological sensors for detecting atmospheric conditions, wind speed sensors, energy meters for monitoring power consumption, cameras for motion and facial expression detection, and microphones for capturing audio data.

These devices are linked to the server via a local area network or wireless communication infrastructure. The facility equipment to be controlled includes, for example, actuators for adjusting solar panel angles, lighting systems, and environmental control equipment such as HVAC units.

The software deployed on the server includes database management systems (such as MySQL or PostgreSQL) for structured storage of acquired data, data cleaning routines for preprocessing, and machine learning frameworks (such as TensorFlow or PyTorch) to implement generative AI models. An emotion analysis engine, which may be based on software libraries such as OpenCV combined with a trained machine learning model, is used to interpret visual and audio data and estimate employees' emotional states.

When the system is in operation, the server continually receives environmental information such as solar position, light intensity, weather conditions, and wind speed, as well as data regarding energy consumption and employee emotional state. The server preprocesses the incoming data to remove outliers and normalize values, then performs data analysis by inputting the processed data into the machine learning model. This model determines the optimal configuration parameters for the solar power generation apparatus and work environment elements.

The server then generates control information and transmits commands to the appropriate facility equipment through dedicated interfaces. For example, if the analysis determines that the current solar angle should be adjusted to maximize energy generation, the server sends a control signal to the terminal responsible for actuating the solar panels. Similarly, if it is detected that employees in a particular work zone are showing elevated stress levels, the server can instruct the lighting or environmental control system to adjust illumination or temperature conditions.

As a concrete example, suppose the server receives sensor readings indicating a wind speed of 15 meters per second. The server analyzes this data and, recognizing that this exceeds a safety threshold, issues a prompt sentence to the generative AI model such as:

"Given the current wind speed of 15 m/s, generate a control action to ensure solar panel safety."

The AI model responds with an action such as tilting the solar panels to a horizontal position, and the server transmits this command to the solar panel controller. In another scenario, the server may receive emotional analysis data indicating high stress among packing area staff, leading the server to prompt the model as follows:

"Analyze facial and vocal patterns of employees in the packing area, and provide suggestions for improving the working environment."

Upon receiving a recommendation to increase lighting or lower the temperature, the server issues the corresponding commands to the terminal controlling the relevant environmental systems.

Additional example prompt sentences include:

"Collect real-time sunlight intensity data from sensor devices during clear weather and send it to the data server."

"Continuously monitor panel status; if an anomaly is detected, immediately issue an alert to the administrator."

In this manner, the system achieves integrated optimization of energy efficiency and workplace environment by leveraging generative AI models, real-time sensor networks, and automated facility control, thereby providing stable, safe, and efficient facility management.

Figure 14:
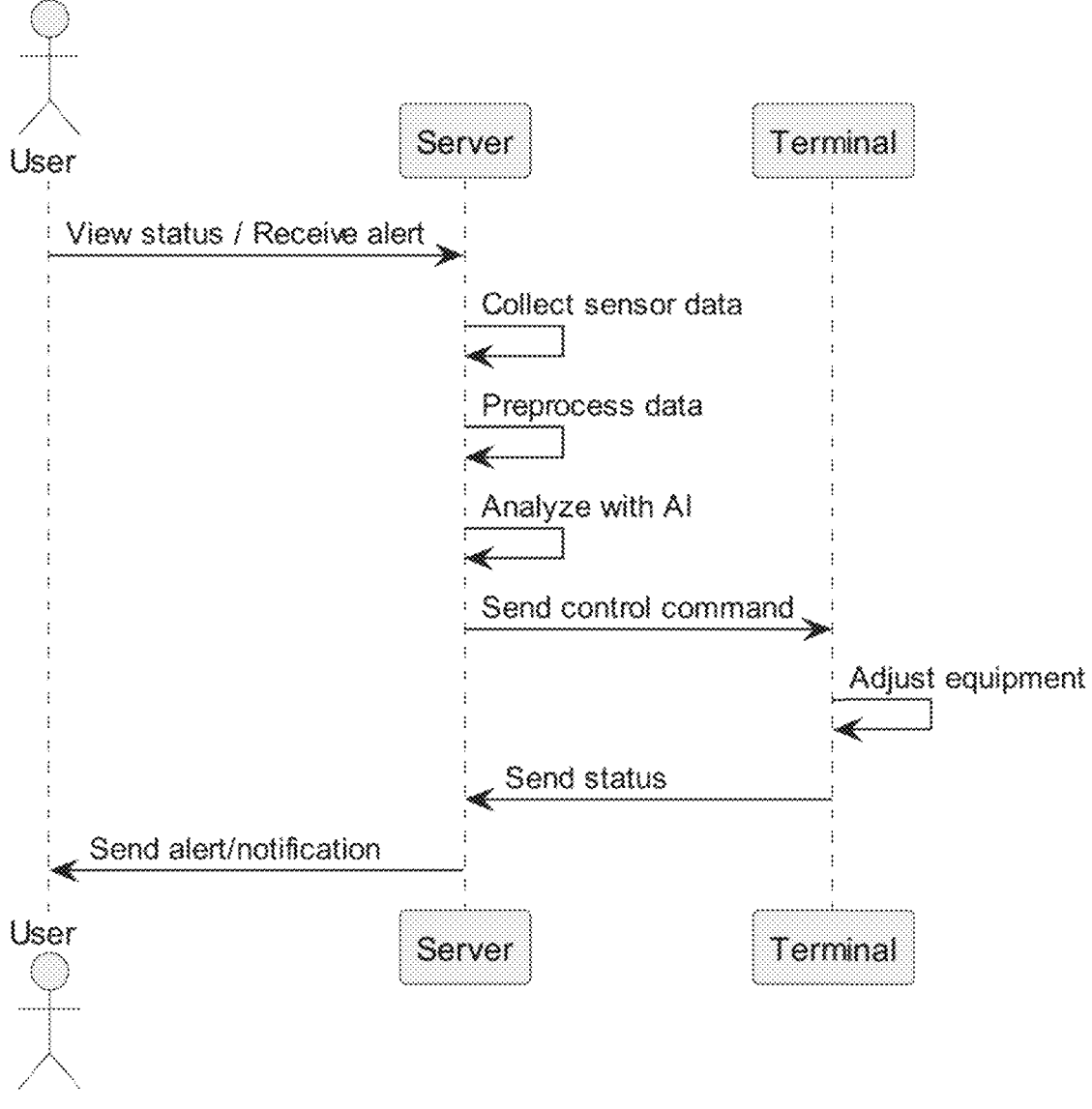
FIG. 14 is a sequence diagram showing the flow of data processing system processing in Application Example 2.

The following describes the processing flow using FIG. 14.

Step 1:

The server collects raw data from various information acquisition devices installed in the facility.

Input: Real-time measurements of solar position, light intensity, weather conditions, wind speed, facility energy consumption, and data from motion detection devices and acoustic acquisition devices.

The server integrates all received signals and stores them in a database, associating each with a timestamp and device identifier.

Output: Structured raw data records containing all environmental, operational, and emotional state parameters.

Step 2:

The server preprocesses the collected data to enhance its quality.

Input: Structured raw data records from Step 1.

The server removes outliers (such as abnormal wind or light values), fills missing values using interpolation, and normalizes the data ranges for each sensor type. The server creates a harmonized dataset ready for AI analysis and stores it in the database.

Output: Cleaned and normalized data set suitable for analysis.

Step 3:

The server analyzes the preprocessed data using a generative AI model.

Input: Cleaned and normalized data set from Step 2.

The server generates prompt sentences relevant to situations (for example, "Current wind speed is 15 m/s, generate a control action to ensure solar panel safety.") and inputs these prompts with the processed data into the machine learning model. The server receives as output the optimal parameters for solar panel configuration, facility energy consumption strategies, and recommendations for work environment adjustments.

Output: AI-generated control actions and optimization recommendations.

Step 4:

The server generates concrete control commands based on AI model outputs and transmits them to the proper terminals.

Input: AI-generated control actions and recommendations from Step 3.

The server converts recommended actions into machine-readable commands (e.g., "Set solar panel angle to 0 degrees," "Switch HVAC in Zone A to cooling mode," or "Increase lighting in packing area.") and sends these commands over the network to the facility's control systems and automated terminals.

Output: Transmitted control commands for hardware adjustments and environmental changes.

Step 5:

The terminal receives and executes the server's control instructions.

Input: Control commands sent from the server in Step 4.

The terminal interprets the received commands and operates actuators to adjust solar panels, lighting, and environmental systems accordingly. The terminal monitors execution results, such as successful adjustment or any detected issues, and reports status back to the server.

Output: Actual adjustment or change of hardware conditions in the facility, and status feedback to the server.

Step 6:

The server continuously monitors real-time status and checks for anomalies after command execution.

Input: Real-time feedback and sensor values reported from terminals and information acquisition devices.

The server compares current operational parameters against preset safety thresholds and historical patterns. If an anomaly (such as over-speed wind detected after a solar panel tilt, or persistent high employee stress) is found, the server generates and sends an alert or notification to the user for intervention.

Output: Alerts, notifications, and updated logs for system administrators and users.

Step 7:

The user receives system-generated notifications and may review or override system actions if necessary.

Input: Alerts or reports provided by the server in Step 6.

The user may acknowledge alerts, consult facility dashboards for status information, and if required, issue manual override instructions to the server or terminals (for instance, forcing a shutdown of equipment or dispatching support staff).

Output: User decisions and optional corrective commands within the facility management system.

The data generation model 58 is a so-called generative artificial intelligence (AI). Examples of the data generation model 58 include generative AIs such as ChatGPT (registered trademark) (Internet search <URL: https://openai.com/blog/chatgpt>) and the like. The data generation model 58 is obtained by performing deep learning with a neural network. The data generation model 58 is input with a prompt including an instruction, and is input with inference data such as audio data representing speech, text data representing text, image data representing images (for example, still image data or video data), and the like. The data generation model 58 takes the input inference data, performs inference according to the instruction indicated in the prompt, and outputs an inference result in one or more data format from out of audio data, text data, image data, or the like. The data generation model 58 includes, for example, a text generative AI, an image generative AI, a multimodal generative AI, or the like. Reference here to inference indicates, for example, analysis, classification, prediction, and/or abstraction etc. The specific processing unit 290 performs the specific processing referred to above while using the data generation model 58. The data generation model 58 may be a model fine-tuned so as to output an inference result from a prompt not including an instruction, and in such cases the data generation model 58 is able to output an inference result from the prompt not including an instruction. There are plural types of the data generation model 58 included in the data processing device 12 or the like, and the data generation models 58 include an AI other than a generative AI. An AI other than a generative AI is, for example, a linear regression, a logistic regression, a decision tree, a random forest, a support vector machine (SVM), a k-means clustering, a convolutional neural network (CNN), a recurrent neural network (RNN), a generative adversarial network (GAN), a naïve Bayes, or the like and is capable of performing various processing, however there is no limitation to such examples. The AI may be an AI agent. Moreover, when the processing of each of the units mentioned above is performed by an AI, this processing is partly or entirely performed by the AI, however there is no limitation to such examples. Moreover, processing executed by an AI including a generative AI may be switched to rule-based processing, and rule-based processing may be switched to processing executed by an AI including a generative AI.

Moreover, although the processing by the data processing system 10 described above was executed by the specific processing unit 290 of the data processing device 12 or by the control unit 46A of the smart device 14, the processing may be executed by a specific processing unit 290 of the data processing device 12 and a control unit 46A of the smart device 14. Moreover, the specific processing unit 290 of the data processing device 12 acquires and collects information needed for processing from the smart device 14 or from an external device or the like, and the smart device 14 acquires and collects information needed for processing from the data processing device 12 or from an external device or the like.

For example, a collection unit is implemented by the control unit 46A of the smart device 14 and/or by the specific processing unit 290 of the data processing device 12. For example, an acquisition unit acquires number-of-steps data using the camera 42 and/or the communication I/F 44 of the smart device 14, and the number-of-steps data is processed by the specific processing unit 290 of the data processing device 12. For example, an analysis unit implemented by the specific processing unit 290 of the data processing device 12 analyzes data from the collection unit and the acquisition unit. For example, a generation unit implemented by the specific processing unit 290 of the data processing device 12 generates a cooking menu using a generative AI. For example, a supply unit implemented by the output device 40 of the smart device 14 and/or the specific processing unit 290 of the data processing device 12 supplies the generated cooking menu to the user. Correspondence relationships of each unit to devices and control units are not limited to the examples described above, and various modifications thereof are possible.

The above exemplary embodiment gives an implementation example in which the specific processing is performed by the data processing device 12, however technology disclosed herein is not limited thereto, and the specific processing may be performed by the smart device 14.

Second Exemplary Embodiment

Figure 3:
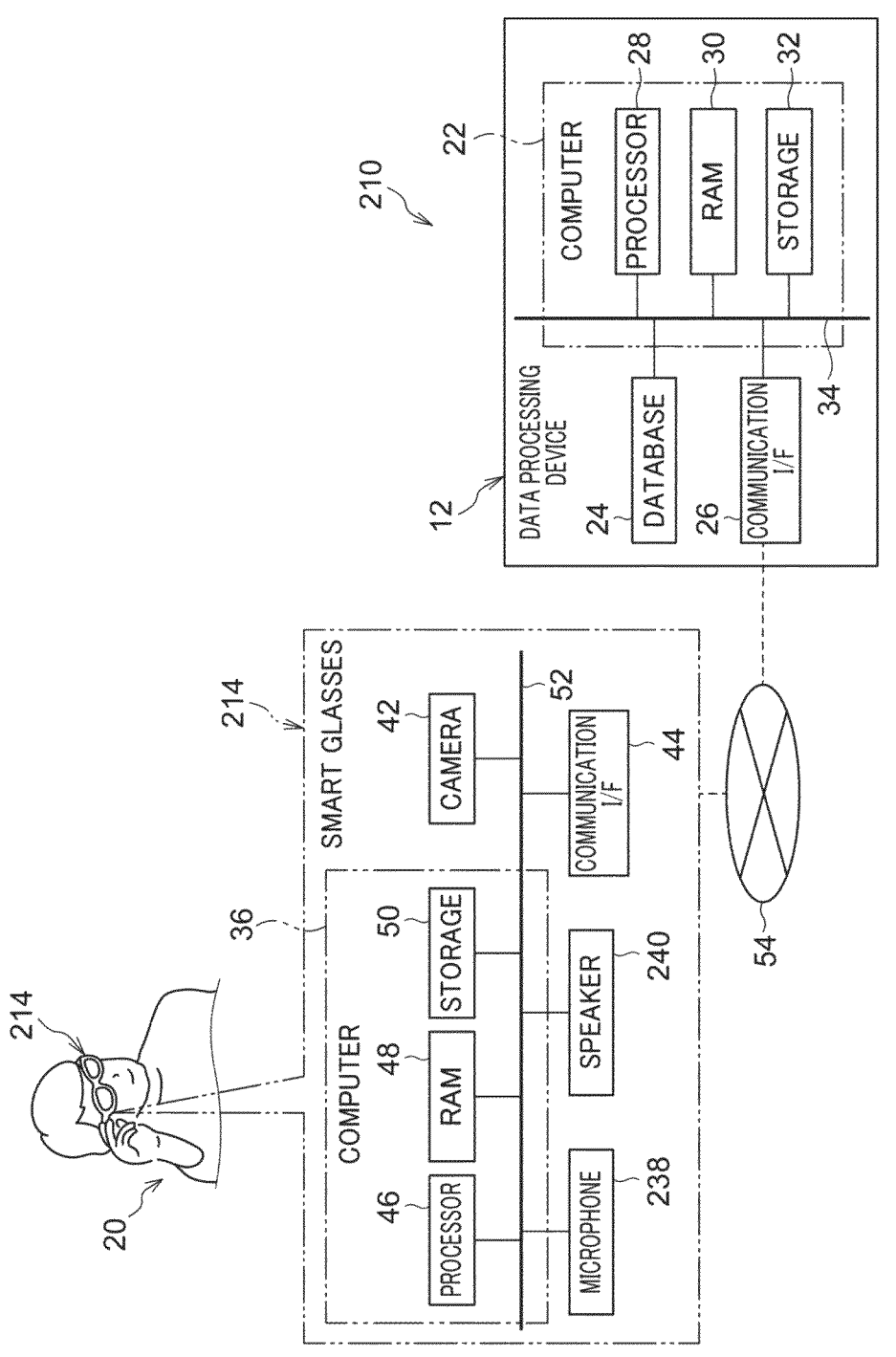
FIG. 3 is a schematic diagram illustrating an example of a configuration of a data processing system according to a second exemplary embodiment.

FIG. 3 illustrates an example of a configuration of a data processing system 210 according to a second exemplary embodiment.

As illustrated in FIG. 3, the data processing system 210 includes a data processing device 12 and smart glasses 214. A server is an example of the data processing device 12.

The data processing device 12 includes a computer 22, a database 24, and a communication I/F 26. The computer 22 is an example of a "computer" according to technology disclosed herein. The computer 22 includes a processor 28, RAM 30, and storage 32. The processor 28, the RAM 30, and the storage 32 are connected to a bus 34. The database 24 and the communication I/F 26 are also connected to the bus 34. The communication I/F 26 is connected to a network 54. Examples of the network 54 include a Wide Area Network (WAN) and/or a local area network (LAN).

The smart glasses 214 include a computer 36, a microphone 238, a speaker 240, a camera 42, and a communication I/F 44. The computer 36 includes a processor 46, RAM 48, and storage 50. The processor 46, the RAM 48, and the storage 50 are connected to a bus 52. The microphone 238, the speaker 240, the camera 42, and the communication I/F 44 are also connected to the bus 52.

The microphone 238 receives an instruction or the like from a user 20 by receiving speech uttered by the user 20. The microphone 238 captures the speech uttered by the user 20, converts the captured speech into audio data, and outputs the audio data to the processor 46. The speaker 240 outputs audio under instruction from the processor 46.

The camera 42 is a compact digital camera installed with an optical system such as a lens, an aperture, a shutter, and the like, and with an imaging device such as a complementary metal-oxide semiconductor (CMOS) image sensor or a charge coupled device (CCD) image sensor or the like. The camera 42 images the surroundings of the user 20 (for example, an imaging range defined by an angle of view equivalent to the width of visual field of an ordinary healthy subject).

The communication I/F 44 is connected to the network 54. The communication I/F 44 and the communication I/F 26 perform the role of exchanging various information between the processor 46 and the processor 28 over the network 54. The exchange of various information between the processor 46 and the processor 28 is performed in a secure state using the communication I/F 44 and the communication I/F 26.

Figure 4:
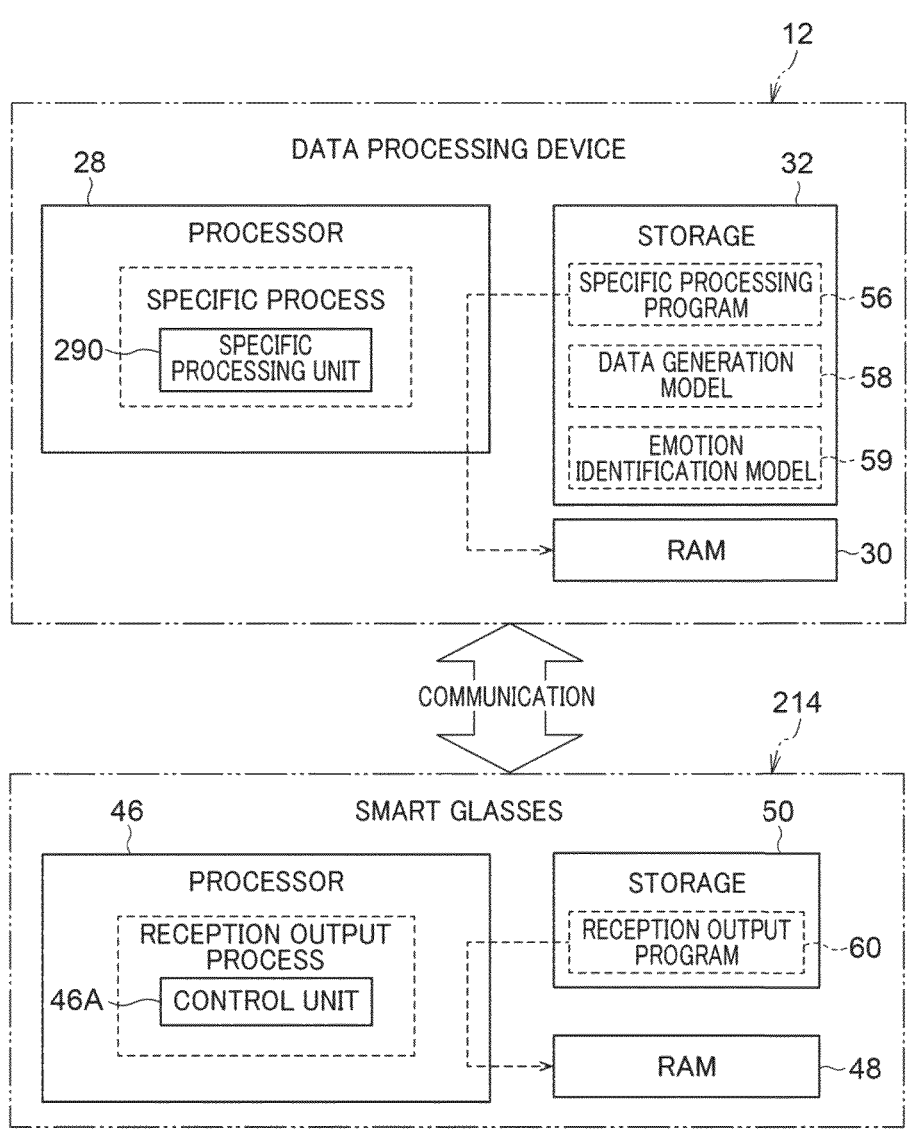
FIG. 4 is a schematic diagram illustrating an example of relevant functions of a data processing device and smart glasses according to the second exemplary embodiment.

FIG. 4 illustrates an example of relevant functions of the data processing device 12 and the smart glasses 214. As illustrated in FIG. 4, specific processing is performed by the processor 28 in the data processing device 12. A specific processing program 56 is stored in the storage 32.

The specific processing program 56 is an example of a "program" according to technology disclosed herein. The processor 28 reads the specific processing program 56 from the storage 32, and in the RAM 30 executes the read specific processing program 56. The specific processing is implemented by the processor 28 operating as the specific processing unit 290 according to the specific processing program 56 executed in the RAM 30.

The data generation model 58 and the emotion identification model 59 are stored in the storage 32. The data generation model 58 and the emotion identification model 59 are employed by the specific processing unit 290. The specific processing unit 290 uses the emotion identification model 59 to estimate an emotion of a user, and is able to perform the specific processing using the user emotion. In an emotion estimation function (emotion identification function) that uses the emotion identification model 59, various estimations, predictions, and the like are performed related to emotions of the user, include estimating and predicting the emotion of the user, however, there is no limitation to such examples. Moreover, estimation and prediction of emotion also includes, for example, analyzing (parsing) emotions and the like.

Reception and output processing is performed by the processor 46 in the smart glasses 214. A reception and output program 60 is stored in the storage 50. The processor 46 reads the reception and output program 60 from the storage 50 and in the RAM 48 executes the read reception and output program 60. The reception and output processing is implemented by the processor 46 operating as the control unit 46A according to the reception and output program 60 executed in the RAM 48. Note that a configuration may be adopted in which the smart glasses 214 include a data generation model and an emotion identification model similar to the data generation model 58 and the emotion identification model 59, and processing similar to the specific processing unit 290 is performed using these models.

Next, description follows regarding the specific processing by the specific processing unit 290 of the data processing device 12. The units of the system described below are implemented by the data processing device 12 and the smart glasses 214. In the following description the data processing device 12 is called a "server", and the smart glasses 214 is called a "terminal".

Example 1

Explanation of flow will be omitted due to being similar to a flow of the specific processing in Example 1 as described in the first exemplary embodiment above.

Application Example 1

Explanation of flow will be omitted due to being similar to a flow of the specific processing in Application Example 1 as described in the first exemplary embodiment above.

Example 2

Explanation of flow will be omitted due to being similar to a flow of the specific processing in Example 2 as described in the first exemplary embodiment above.

Application Example 2

Explanation of flow will be omitted due to being similar to a flow of the specific processing in Application Example 2 as described in the first exemplary embodiment above.

The specific processing unit 290 transmits a result of the specific processing to the smart glasses 214. The control unit 46A in the smart glasses 214 outputs the specific processing result to the speaker 240. The microphone 238 acquires audio representing user input in response to the specific processing result. The control unit 46A transmits audio data representing the user input as acquired by the microphone 238 to the data processing device 12. The specific processing unit 290 in the data processing device 12 acquires the audio data.

The data generation model 58 is a so-called generative artificial intelligence (AI). Examples of the data generation model 58 include generative AIs such as ChatGPT (registered trademark) (Internet search <URL: https://openai.com/blog/chatgpt>) and the like. The data generation model 58 is obtained by performing deep learning with a neural network. The data generation model 58 is input with a prompt including an instruction, and is input with inference data such as audio data representing speech, text data representing text, image data representing images (for example, still image data or video data), and the like. The data generation model 58 takes the input inference data, performs inference according to the instruction indicated in the prompt, and outputs an inference result in one or more data format from out of audio data, text data, image data, or the like. The data generation model 58 includes, for example, a text generative AI, an image generative AI, a multimodal generative AI, or the like. Reference here to inference indicates, for example, analysis, classification, prediction, and/or abstraction etc. The specific processing unit 290 performs the specific processing referred to above while using the data generation model 58. The data generation model 58 may be a model fine-tuned so as to output an inference result from a prompt not including an instruction, and in such cases the data generation model 58 is able to output an inference result from the prompt not including an instruction. There are plural types of the data generation model 58 included in the data processing device 12 or the like, and the data generation models 58 include an AI other than a generative AI. An AI other than a generative AI is, for example, a linear regression, a logistic regression, a decision tree, a random forest, a support vector machine (SVM), a k-means clustering, a convolutional neural network (CNN), a recurrent neural network (RNN), a generative adversarial network (GAN), a naïve Bayes, or the like and is capable of performing various processing, however there is no limitation to such examples. The AI may be an AI agent. Moreover, when the processing of each of the units mentioned above is performed by an AI, this processing is partly or entirely performed by the AI, however there is no limitation to such examples. Moreover, processing executed by an AI including a generative AI may be switched to rule-based processing, and rule-based processing may be switched to processing executed by an AI including a generative AI.

Although the processing by the data processing system 10 described above is executed by the specific processing unit 290 of the data processing device 12 or by the control unit 46A of the smart glasses 214, the processing may be executed by a specific processing unit 290 of the data processing device 12 and a control unit 46A of the smart glasses 214. Moreover, the specific processing unit 290 of the data processing device 12 acquires and collects information needed for processing from the smart glasses 214 or from an external device or the like, and the smart glasses 214 acquires and collects information needed for processing from the data processing device 12 or from an external device or the like.

For example, the collection unit is implemented by the control unit 46A of the smart glasses 214 and/or by the specific processing unit 290 of the data processing device 12. For example, an acquisition unit acquires number-of-steps data using the camera 42 and/or the communication I/F 44 of the smart glasses 214, and the number-of-steps data is processed by the specific processing unit 290 of the data processing device 12. For example, an analysis unit implemented by the specific processing unit 290 of the data processing device 12 analyzes data from the collection unit and the acquisition unit. For example, a generation unit implemented by the specific processing unit 290 of the data processing device 12 generates a cooking menu using a generative AI. For example, a supply unit implemented by the speaker 240 of the smart glasses 214 and/or the specific processing unit 290 of the data processing device 12 supplies the generated cooking menu to the user. Correspondence relationships of each unit to devices and control units are not limited to the examples described above, and various modifications thereof are possible.

The above exemplary embodiment gives an implementation example in which the specific processing is performed by the data processing device 12, however technology disclosed herein is not limited thereto, and the specific processing may be performed by the smart glasses 214.

Third Exemplary Embodiment

Figure 5:
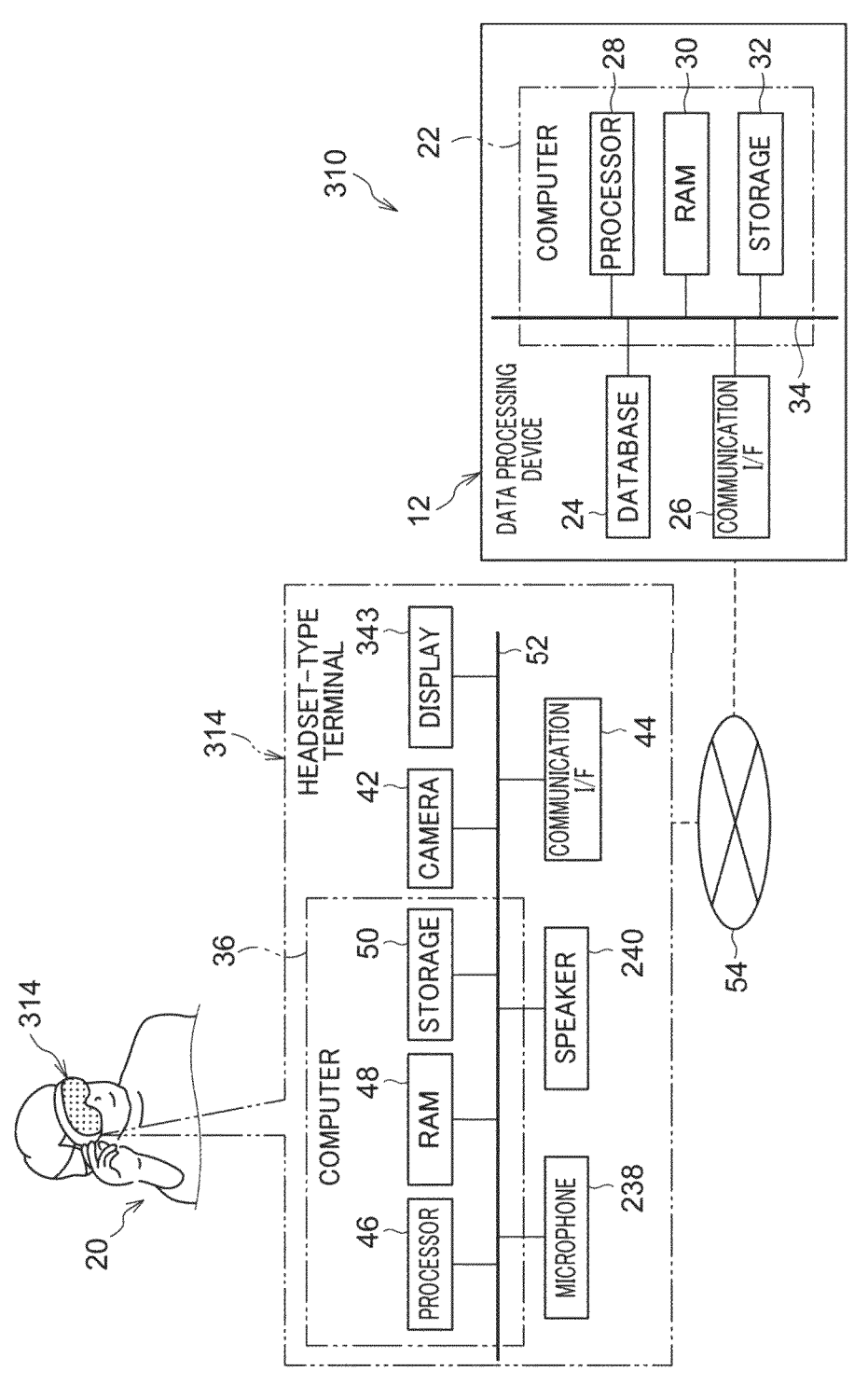
FIG. 5 is a schematic diagram illustrating an example of a configuration of a data processing system according to a third exemplary embodiment.

FIG. 5 illustrates an example of a configuration of a data processing system 310 according to a third exemplary embodiment.

As illustrated in FIG. 5, the data processing system 310 includes a data processing device 12 and a headset-type terminal 314. A server is an example of the data processing device 12.

The data processing device 12 includes a computer 22, a database 24, and a communication I/F 26. The computer 22 is an example of a "computer" according to technology disclosed herein. The computer 22 includes a processor 28, RAM 30, and storage 32. The processor 28, the RAM 30, and the storage 32 are connected to a bus 34. The database 24 and the communication I/F 26 are also connected to the bus 34. The communication I/F 26 is connected to a network

54. Examples of the network 54 include a Wide Area Network (WAN) and/or a local area network (LAN).

The headset-type terminal 314 includes a computer 36, a microphone 238, a speaker 240, a camera 42, a communication I/F 44, and a display 343. The computer 36 includes a processor 46, RAM 48, and storage 50. The processor 46, the RAM 48, and the storage 50 are connected to a bus 52. The microphone 238, the speaker 240, the camera 42, the display 343, and the communication I/F 44 are also connected to the bus 52.

The microphone 238 receives an instruction or the like from a user 20 by receiving speech uttered by the user 20. The microphone 238 captures the speech uttered by the user 20, converts the captured speech into audio data, and outputs the audio data to the processor 46. The speaker 240 outputs audio under instruction from the processor 46.

The camera 42 is a compact digital camera installed with an optical system such as a lens, an aperture, a shutter, and the like, and with an imaging device such as a complementary metal-oxide semiconductor (CMOS) image sensor or a charge coupled device (CCD) image sensor or the like. The camera 42 images the surroundings of the user 20 (for example, an imaging range defined by an angle of view equivalent to the width of visual field of an ordinary healthy subject).

The communication I/F 44 is connected to the network 54. The communication I/F 44 and the communication I/F 26 perform the role of exchanging various information between the processor 46 and the processor 28 over the network 54. The exchange of various information between the processor 46 and the processor 28 is performed in a secure state using the communication I/F 44 and the communication I/F 26.

Figure 6:
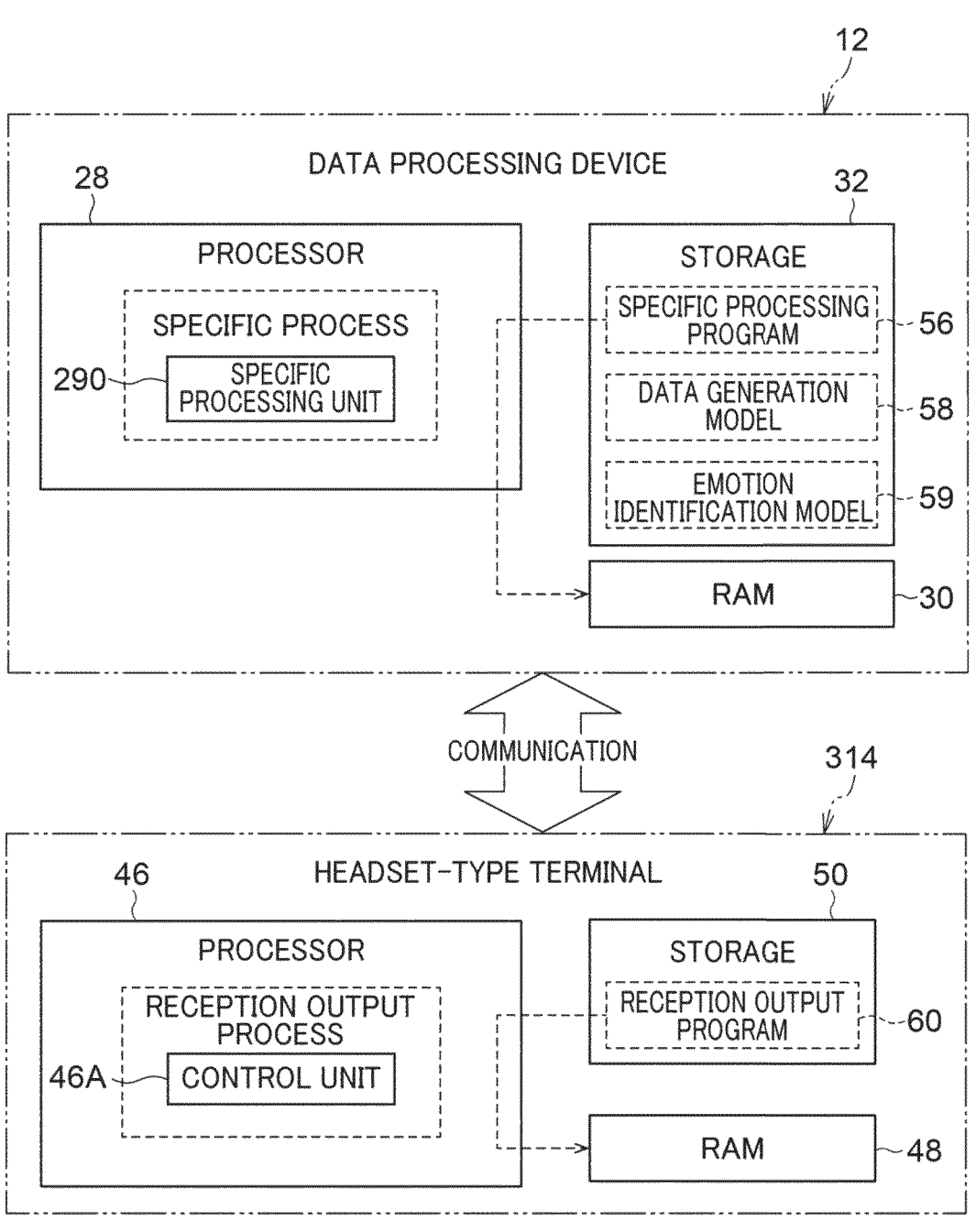
FIG. 6 is a schematic diagram illustrating an example of relevant functions of a data processing device and a headset-type terminal according to the third exemplary embodiment.

FIG. 6 illustrates an example of relevant functions of the data processing device 12 and the headset-type terminal 314. As illustrated in FIG. 6, specific processing is performed by the processor 28 in the data processing device 12. A specific processing program 56 is stored in the storage 32.

The specific processing program 56 is an example of a "program" according to technology disclosed herein. The processor 28 reads the specific processing program 56 from the storage 32, and in the RAM 30 executes the read specific processing program 56. The specific processing is implemented by the processor 28 operating as the specific processing unit 290 according to the specific processing program 56 executed in the RAM 30.

The data generation model 58 and the emotion identification model 59 are stored in the storage 32. The data generation model 58 and the emotion identification model 59 are employed by the specific processing unit 290.

Reception and output processing is performed by the processor 46 in the headset-type terminal 314. A reception and output program 60 is stored in the storage 50. The processor 46 reads the reception and output program 60 from the storage 50, and in the RAM 48 executes the read reception and output program 60. The reception and output processing is implemented by the processor 46 operating as the control unit 46A according to the reception and output program 60 executed in the RAM 48.

Next, description follows regarding the specific processing by the specific processing unit 290 of the data processing device 12. The units of the system described below are implemented by the data processing device 12 and the headset-type terminal 314.

In the following description the data processing device 12 is called a "server", and the headset-type terminal 314 is called a "terminal".

Example 1

Explanation of flow will be omitted due to being similar to a flow of the specific processing in Example 1 as described in the first exemplary embodiment above.

Application Example 1

Explanation of flow will be omitted due to being similar to a flow of the specific processing in Application Example 1 as described in the first exemplary embodiment above.

Example 2

Explanation of flow will be omitted due to being similar to a flow of the specific processing in Example 2 as described in the first exemplary embodiment above.

Application Example 2

Explanation of flow will be omitted due to being similar to a flow of the specific processing in Application Example 2 as described in the first exemplary embodiment above.

The specific processing unit 290 transmits a result of the specific processing to the headset-type terminal 314. In the headset-type terminal 314, the control unit 46A outputs the result of the specific processing to the speaker 240 and the display 343. The microphone 238 acquires audio representing user input in response to the specific processing result. The control unit 46A transmits audio data representing the user input as acquired by the microphone 238 to the data processing device 12. The specific processing unit 290 in the data processing device 12 acquires the audio data.

The data generation model 58 is a so-called generative artificial intelligence (AI). Examples of the data generation model 58 include generative AIs such as ChatGPT (registered trademark) (Internet search <URL: https://openai.com/blog/chatgpt>) and the like. The data generation model 58 is obtained by performing deep learning with a neural network. The data generation model 58 is input with a prompt including an instruction, and is input with inference data such as audio data representing speech, text data representing text, image data representing images (for example, still image data or video data), and the like. The data generation model 58 takes the input inference data, performs inference according to the instruction indicated in the prompt, and outputs an inference result in one or more data format from out of audio data, text data, image data, or the like. The data generation model 58 includes, for example, a text generative AI, an image generative AI, a multimodal generative AI, or the like. Reference here to inference indicates, for example, analysis, classification, prediction, and/or abstraction etc. The specific processing unit 290 performs the specific processing referred to above while using the data generation model 58. The data generation model 58 may be a model fine-tuned so as to output an inference result from a prompt not including an instruction, and in such cases the data generation model 58 is able to output an inference result from the prompt not including an instruction. There are plural types of the data generation model 58 included in the data processing device 12 or the like, and the data generation models 58 include an AI other than a generative AI. An AI other than a generative AI is, for example, a linear regression, a logistic regression, a decision tree, a random forest, a support vector machine (SVM), a k-means clustering, a convolutional neural network (CNN), a recurrent neural network (RNN), a generative adversarial network (GAN), a naïve Bayes, or the like and is capable of performing various processing, however there is no limitation to such examples. The AI may be an AI agent. Moreover, when the processing of each of the units mentioned above is performed by an AI, this processing is partly or entirely performed by the AI, however there is no limitation to such examples. Moreover, processing executed by an AI including a generative AI may be switched to rule-based processing, and rule-based processing may be switched to processing executed by an AI including a generative AI.

Although the processing by the data processing system 10 described above is executed by the specific processing unit 290 of the data processing device 12 or by the control unit 46A of the headset-type terminal 314, the processing may be executed by a specific processing unit 290 of the data processing device 12 and a control unit 46A of the headset-type terminal 314. Moreover, the specific processing unit 290 of the data processing device 12 acquires and collects information needed for processing from the headset-type terminal 314 or from an external device or the like, and the headset-type terminal 314 acquires and collects information needed for processing from the data processing device 12 or from an external device or the like.

For example, the collection unit is implemented by the control unit 46A of the headset-type terminal 314 and/or by the specific processing unit 290 of the data processing device 12. For example, an acquisition unit acquires number-of-steps data using the camera 42 and/or the communication I/F 44 of the headset-type terminal 314, and the number-of-steps data is processed by the specific processing unit 290 of the data processing device 12. For example, an analysis unit implemented by the specific processing unit 290 of the data processing device 12 analyzes data from the collection unit and the acquisition unit. For example, a generation unit implemented by the specific processing unit 290 of the data processing device 12 generates a cooking menu using a generative AI. For example, a supply unit implemented by the speaker 240 and the display 343 of the headset-type terminal 314 and/or the specific processing unit 290 of the data processing device 12 supplies the generated cooking menu to the user. Correspondence relationships of each unit to devices and control units are not limited to the examples described above, and various modifications thereof are possible.

The above exemplary embodiment gives an implementation example in which the specific processing is performed by the data processing device 12, however technology disclosed herein is not limited thereto, and the specific processing may be performed by the headset-type terminal 314.

Fourth Exemplary Embodiment

Figure 7:
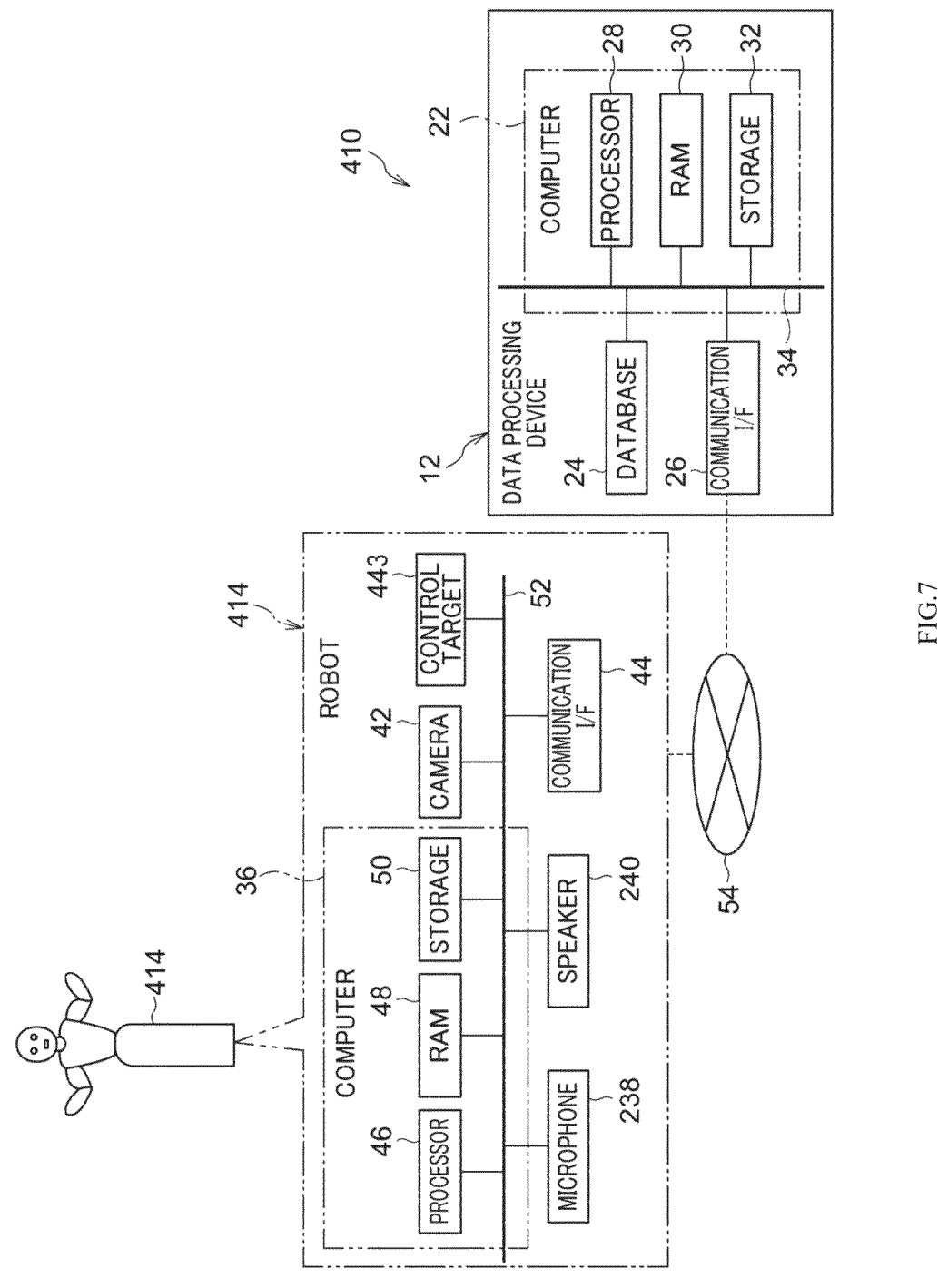
FIG. 7 is a schematic diagram illustrating an example of a configuration of a data processing system according to a fourth exemplary embodiment.

FIG. 7 illustrates an example of a configuration of a data processing system 410 according to a fourth exemplary embodiment As illustrated in FIG. 7, the data processing system 410 includes a data processing device 12 and a robot 414. A server is an example of the data processing device 12.

The data processing device 12 includes a computer 22, a database 24, and a communication I/F 26. The computer 22 is an example of a "computer" according to technology disclosed herein. The computer 22 includes a processor 28, RAM 30, and storage 32. The processor 28, the RAM 30, and the storage 32 are connected to a bus 34. The database 24 and the communication I/F 26 are also connected to the bus 34. The communication I/F 26 is connected to a network 54. Examples of the network 54 include a Wide Area Network (WAN) and/or a local area network (LAN).

The robot 414 includes a computer 36, a microphone 238, a speaker 240, a camera 42, a communication I/F 44, and a control target 443. The computer 36 includes a processor 46, RAM 48, and storage 50. The processor 46, the RAM 48, and the storage 50 are connected to a bus 52. The microphone 238, the speaker 240, the camera 42, the control target 443, and the communication I/F 44 are also connected to the bus 52.

The microphone 238 receives an instruction or the like from a user 20 by receiving speech uttered by the user 20. The microphone 238 captures the speech uttered by the user 20, converts the captured speech into audio data, and outputs the audio data to the processor 46. The speaker 240 outputs audio under instruction from the processor 46.

The camera 42 is a compact digital camera installed with an optical system such as a lens, an aperture, a shutter, and the like, and with an imaging device such as a complementary metal-oxide semiconductor (CMOS) image sensor or a charge coupled device (CCD) image sensor or the like. The camera 42 images the surroundings of the robot 414 (for example, with an imaging range defined by an angle of view equivalent to the width of visual field of an ordinary healthy subject).

The communication I/F 44 is connected to the network 54. The communication I/F 44 and the communication I/F 26 perform the role of exchanging various information between the processor 46 and the processor 28 over the network 54. The exchange of various information between the processor 46 and the processor 28 is performed in a secure state using the communication I/F 44 and the communication I/F 26.

The control target 443 includes a display device, eye LEDs, and motors to drive arms, hands, feet, and the like. The posture and gesture of the robot 414 are controlled by controlling the motors of the arms, hands, feet, and the like. Part of an emotion of the robot 414 can be expressed by controlling these motors. Moreover, a facial expression of the robot 414 can be represented by controlling an illumination state of the eye LEDs of the robot 414.

Figure 8:
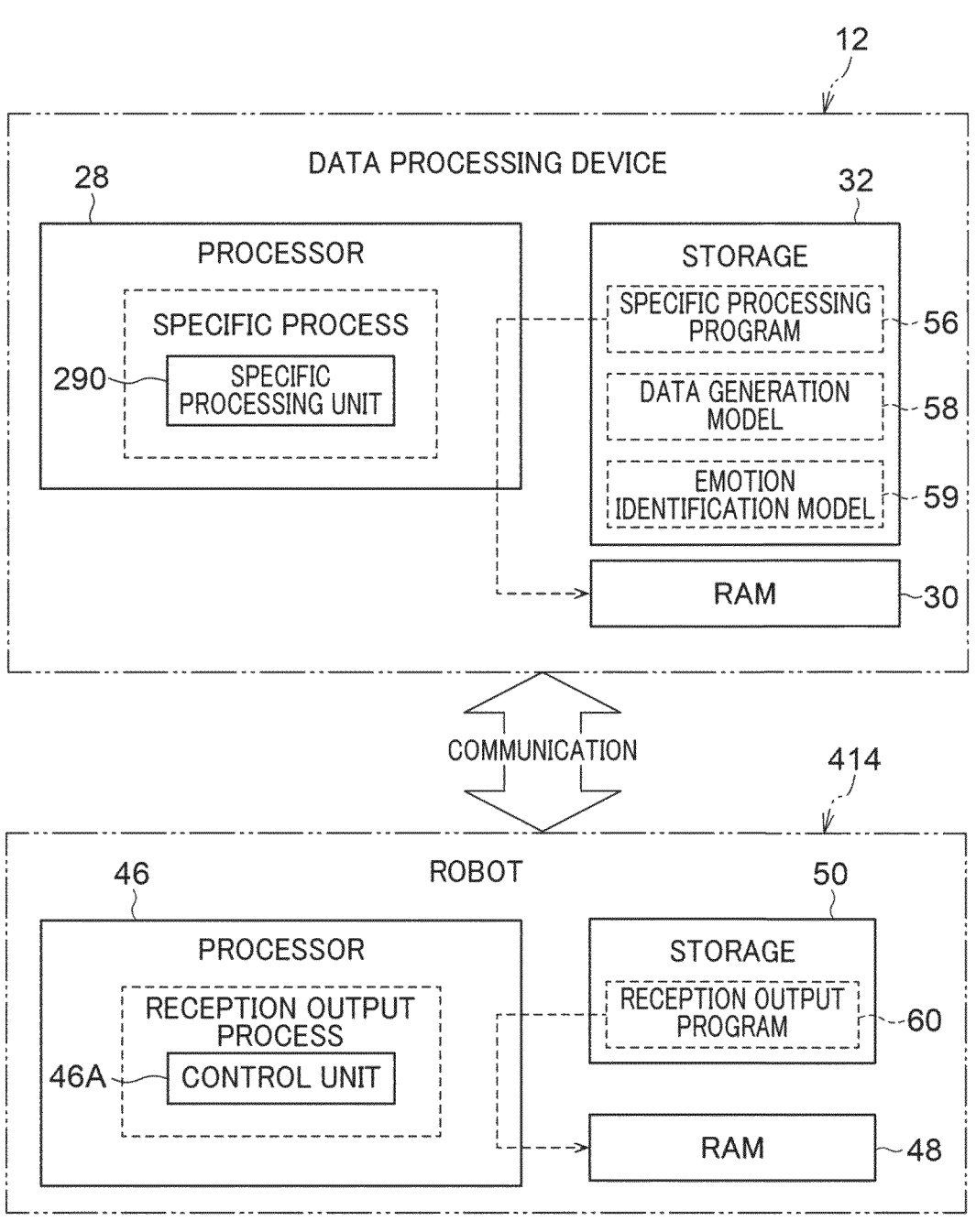
FIG. 8 is a schematic diagram illustrating an example of relevant functions of a data processing device and a robot according to the fourth exemplary embodiment.

FIG. 8 illustrates an example of relevant functions of the data processing device 12 and the robot 414. As illustrated in FIG. 8, specific processing is performed by the processor 28 in the data processing device 12. A specific processing program 56 is stored in the storage 32.

The specific processing program 56 is an example of a "program" according to technology disclosed herein. The processor 28 reads the specific processing program 56 from the storage 32, and in the RAM 30 executes the read specific processing program 56. The specific processing is implemented by the processor 28 operating as the specific processing unit 290 according to the specific processing program 56 executed in the RAM 30.

The data generation model 58 and the emotion identification model 59 are stored in the storage 32. The data generation model 58 and the emotion identification model 59 are employed by the specific processing unit 290.

Reception and output processing is performed by the processor 46 in the robot 414. A reception and output program 60 is stored in the storage 50. The processor 46 reads the reception and output program 60 from the storage 50, and in the RAM 48 executes the read reception and output program 60. The reception and output processing is implemented by the processor 46 operating as the control unit 46A according to the reception and output program 60 executed in the RAM 48.

Next, description follows regarding the specific processing by the specific processing unit 290 of the data processing device 12. The units of the system described below are implemented by the data processing device 12 and the robot 414. In the following description the data processing device 12 is called a "server", and the robot 414 is called a "terminal".

Example 1

Explanation of flow will be omitted due to being similar to a flow of the specific processing in Example 1 as described in the first exemplary embodiment above.

Application Example 1

Explanation of flow will be omitted due to being similar to a flow of the specific processing in Application Example 1 as described in the first exemplary embodiment above.

Example 2

Explanation of flow will be omitted due to being similar to a flow of the specific processing in Example 2 as described in the first exemplary embodiment above.

Application Example 2

Explanation of flow will be omitted due to being similar to a flow of the specific processing in Application Example 2 as described in the first exemplary embodiment above.

The specific processing unit 290 transmits a result of the specific processing to the robot 414. In the robot 414, the control unit 46A outputs the result of the specific processing to the speaker 240 and the control target 443. The microphone 238 acquires audio representing user input in response to the specific processing result. The control unit 46A transmits audio data representing the user input as acquired by the microphone 238 to the data processing device 12. The specific processing unit 290 in the data processing device 12 acquires the audio data.

The data generation model 58 is a so-called generative artificial intelligence (AI). Examples of the data generation model 58 include generative AIs such as ChatGPT (registered trademark) (Internet search <URL: https://openai.com/blog/chatgpt>) and the like. The data generation model 58 is obtained by performing deep learning with a neural network. The data generation model 58 is input with a prompt including an instruction, and is input with inference data such as audio data representing speech, text data representing text, image data representing images (for example, still image data or video data), and the like. The data generation model 58 takes the input inference data, performs inference according to the instruction indicated in the prompt, and outputs an inference result in one or more data format from out of audio data, text data, image data, or the like. The data generation model 58 includes, for example, a text generative AI, an image generative AI, a multimodal generative AI, or the like. Reference here to inference indicates, for example, analysis, classification, prediction, and/or abstraction etc. The specific processing unit 290 performs the specific processing referred to above while using the data generation model 58. The data generation model 58 may be a model fine-tuned so as to output an inference result from a prompt not including an instruction, and in such cases the data generation model 58 is able to output an inference result from the prompt not including an instruction. There are plural types of the data generation model 58 included in the data processing device 12 or the like, and the data generation models 58 include an AI other than a generative AI. An AI other than a generative AI is, for example, a linear regression, a logistic regression, a decision tree, a random forest, a support vector machine (SVM), a k-means clustering, a convolutional neural network (CNN), a recurrent neural network (RNN), a generative adversarial network (GAN), a naïve Bayes, or the like and is capable of performing various processing, however there is no limitation to such examples. The AI may be an AI agent. Moreover, when the processing of each of the units mentioned above is performed by an AI, this processing is partly or entirely performed by the AI, however there is no limitation to such examples. Moreover, processing executed by an AI including a generative AI may be switched to rule-based processing, and rule-based processing may be switched to processing executed by an AI including a generative AI.

Although the processing by the data processing system 10 described above is executed by the specific processing unit 290 of the data processing device 12 or by the control unit 46A of the robot 414, the processing may be executed by a specific processing unit 290 of the data processing device 12 and a control unit 46A of the robot 414. Moreover, the specific processing unit 290 of the data processing device 12 acquires and collects information needed for processing from the robot 414 or from an external device or the like, and the robot 414 acquires and collects information needed for processing from the data processing device 12 or from an external device or the like.

For example, the collection unit is implemented by the control unit 46A of the robot 414 and/or by the specific processing unit 290 of the data processing device 12. For example, an acquisition unit acquires number-of-steps data using the camera 42 and/or the communication I/F 44 of the robot 414, and the number-of-steps data is processed by the specific processing unit 290 of the data processing device 12. For example, an analysis unit implemented by the specific processing unit 290 of the data processing device 12 analyzes data from the collection unit and the acquisition unit. For example, a generation unit implemented by the specific processing unit 290 of the data processing device 12 generates a cooking menu using a generative AI. For example, a supply unit implemented by the speaker 240 and the control target 443 of the robot 414 and/or the specific processing unit 290 of the data processing device 12 supplies the generated cooking menu to the user. Correspondence relationships of each unit to devices and control units are not limited to the examples described above, and various modifications thereof are possible.

The above exemplary embodiment gives an implementation example in which the specific processing is performed by the data processing device 12, however technology disclosed herein is not limited thereto, and the specific processing may be performed by the robot 414.

Note that the emotion identification model 59 serves as an emotion engine, and may decide the emotion of a user according to a specific mapping. Specifically, the emotion identification model 59 may decide the emotion of a user according to an emotion map (see FIG. 9) that is a specific mapping. Moreover, the emotion identification model 59 may also decide the emotion of the robot similarly, and the specific processing unit 290 may be configured so as to perform the specific processing using the emotion of the robot.

Figure 9:
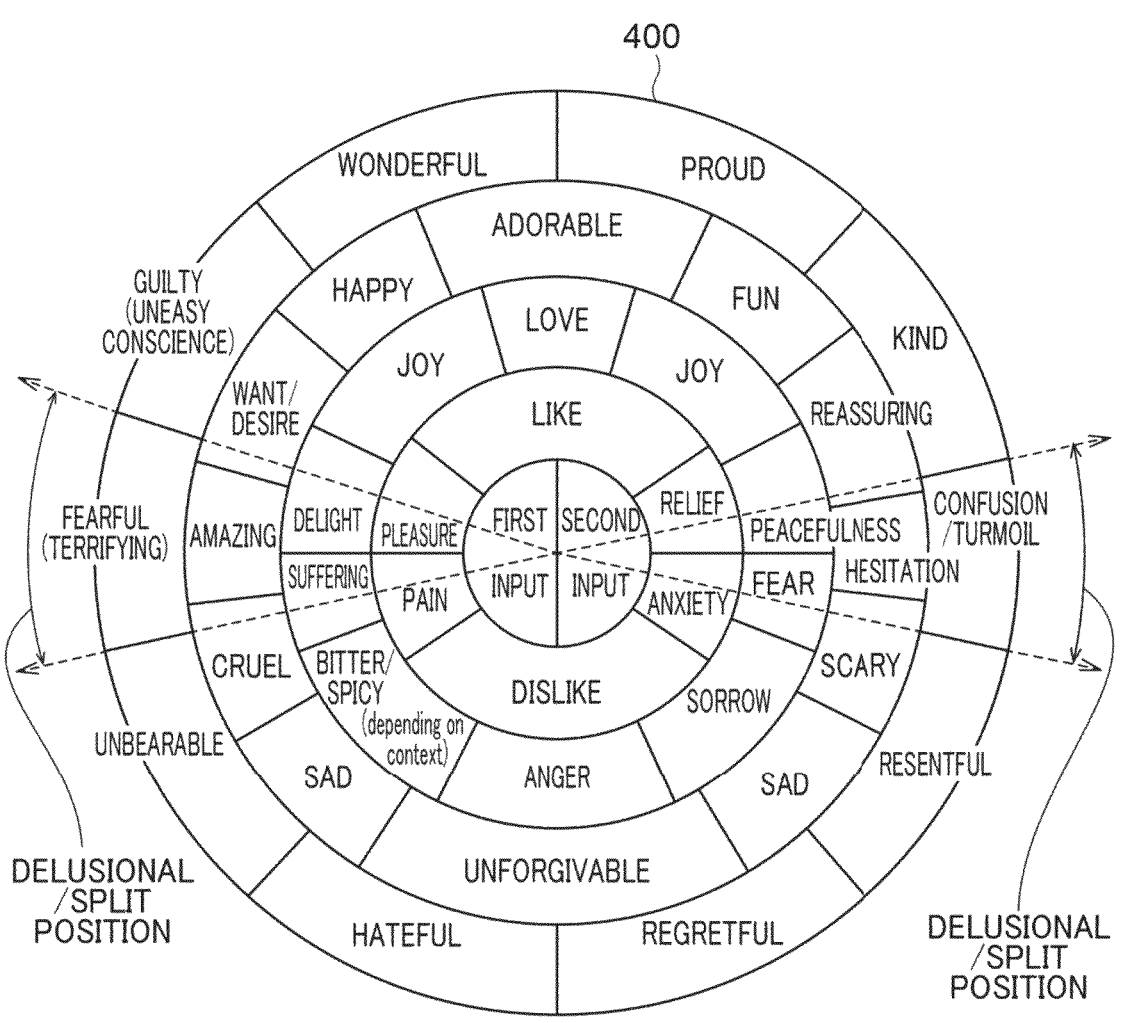
FIG. 9 illustrates an emotion map mapping plural emotions.

FIG. 9 is a diagram illustrating an emotion map 400 mapping plural emotions. In the emotion map 400, emotions are arranged in concentric circles that radiate out from the center. Primitive states of emotion are arranged nearer to the center of the concentric circles. Emotions expressing states and actions generated from states of mind are arranged further toward the outside of the concentric circles. Emotions are defined as including both affect and mental states. Emotions generated from reactions occurring in the brain are generally arranged at the left side of the concentric circles. Emotions induced by situational assessment are generally arranged at the right side of the concentric circles. Emotions generated from reactions occurring in the brain that are also emotions induced by situational assessment are generally arranged toward the top and toward the bottom of the concentric circles. Moreover, emotions of "euphoria" are arranged at the upper side of the concentric circles, and emotions of "dysphoria" are arranged at the lower side of the concentric circles. Plural emotions are accordingly mapped in this manner in the emotion map 400 based on a structure giving rise to emotions, and emotions that readily occur at the same time are mapped close to each other.

An example of such emotions is a distribution of emotions in the direction of 3 o'clock on the emotion map 400, generally around a boundary between relief and anxiety. Situational awareness dominates over internal sensations in the right half of the emotion map 400, with an impression of calm.

The inside of the emotion map 400 represents feelings, and the outside of the emotion map 400 represents actions, and so emotions further toward the outside of the emotion map 400 are more visible (are expressed by actions).

Human emotions are based on various balances, such as posture and blood sugar value balances, with a state of dysphoria being exhibited when these balances are far from ideal and a state of euphoria being exhibited when these balances are near to ideal. Even in a robot, a car, a motorbike, or the like, emotions can be thought of as being based on various balances such as orientation and remaining battery balances, with a state called dysphoria being exhibited when these balances are far from ideal and a state called euphoria being exhibited when these balances are near to ideal. An emotion map may, for example, be generated based on the emotion map of Dr. Mitsuyoshi (PhD Dissertation https://ci.nii.ac.jp/naid/500000375379: "Research on the phonetic recognition of feelings and a system for emotional physiological brain signal analysis", Tokushima University). Emotions belonging to an area called "reaction" where feeling dominates are arranged in the left half of the emotion map. Moreover, emotions belonging to an area called "situation" where situational awareness dominates are arranged in the right half of the emotion map.

There are two types of emotion that facilitate leaning in an emotion map. One is an emotion in the vicinity of the center of negative "penitence" and "reflection" on the situational side. In other words, sometimes a negative "emotion" such as "I don't want to feel this way ever again" and "I don't want to be chided again" is experienced in a robot. Another is a positive emotion in the area of "desire" on the reaction side. In other words, there are times when a positive feeling such as "desire more" and "want to know more" is experienced.

Figure 10:
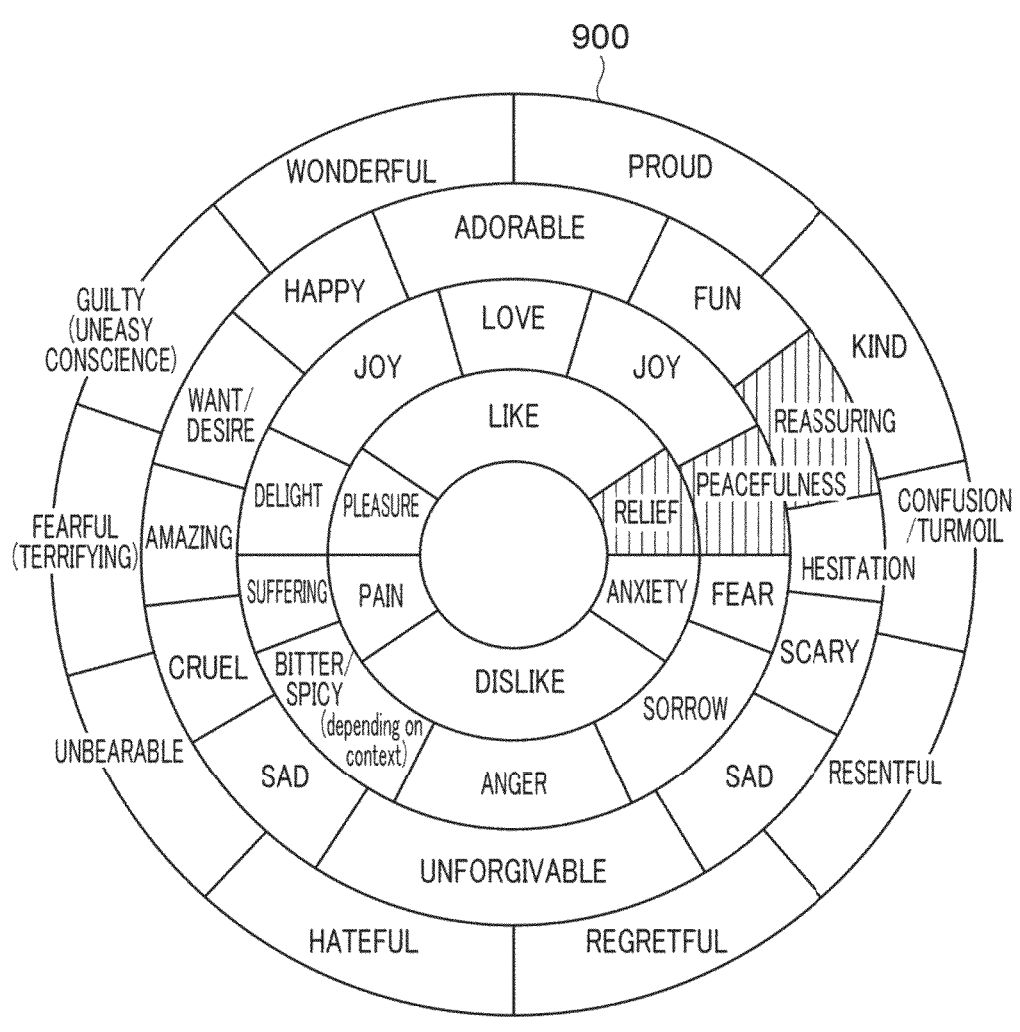
FIG. 10 illustrates an emotion map mapping plural emotions.

In the emotion identification model 59, user input is input to a pre-trained neural network, and emotion values indicating emotions shown on the emotion map 400 are acquired and the emotions of the user are decided. This neural network is pre-trained based on plural training data sets that each combine a user input with an emotion value indicating an emotion shown on the emotion map 400. The neural network is also trained such that emotions arranged close to each other have values that are close to each other, as in an emotion map 900 illustrated in FIG. 10. In FIG. 10 the plural emotions of "relief", "peaceful", and "reassured" are indicated as an example of close emotion values.

Although the system according to the present disclosure has been described mainly as functions of the data processing device 12, the system according to the present disclosure is not limited to being implemented in a server. The system according to the present disclosure may be implemented as a general information processing system. The present disclosure may, for example, be implemented by a software program operating on a personal computer, and may be implemented by an application operating on a smartphone or the like. The method according to the present disclosure may also be supplied to a user in the form of Software as a Service (SaaS).

Although in the exemplary embodiments described above examples are given of embodiments in which the specific processing is performed by a single computer 22, technology disclosed herein is not limited thereto, and distributed processing may be performed for the specific processing, with the specific processing distributed across plural computers including the computer 22. For example, the data generation model 58 may be provided in a device external to the data processing device 12, such that data generation in response to input data is performed in the external device.

Although in the exemplary embodiments described above examples are described of embodiments in which the specific processing program 56 is stored in the storage 32, the technology disclosed herein is not limited thereto. For example, the specific processing program 56 may be stored on a portable, non-transitory, computer readable, storage medium, such as universal serial bus (USB) memory or the like. The specific processing program 56 stored on the non-transitory storage medium is then installed on the computer 22 of the data processing device 12. The processor 28 then executes the specific processing according to the specific processing program 56.

Moreover, the specific processing program 56 may be stored on a storage device, such as a server connected to the data processing device 12 over the network 54, with the specific processing program 56 then being downloaded in response to a request from the data processing device 12 and installed on the computer 22.

Note that there is no need to store the entire specific processing program 56 on the storage device, such as a server connected to the data processing device 12 over the network 54, or to store the entire specific processing program 56 on the storage 32, and part of the specific processing program 56 may be stored thereon.

Hardware resources for executing the specific processing may use various processors as listed below. Examples of processors include, for example, a CPU that is a general-purpose processor that functions as a hardware resource to execute the specific processing by executing software, namely a program. Moreover, the processor may, for example, be a dedicated electronic circuit that is a processor having a circuit configuration custom designed for executing the specific processing, such as a field-programmable gate array (FPGA), a programmable logic device (PLD), or an application specific integrated circuit (ASIC). Memory is inbuilt or connected to each of these processors, and the specific processing is executed by each of these processors using the memory.

The hardware resource that executes the specific processing may be configured from one of these various processors, or may be configured from a combination of two or more processors of the same or different type (for example, a combination of plural FPGAs, or a combination of a CPU and a FPGA). The hardware resource executing the specific processing may be a single processor.

Examples of configurations of a single processor include, firstly, a configuration of a single processor resulting from combining one or more CPU and software, in an embodiment in which this processor functions as the hardware resource for executing the specific processing. Secondly, as typified by a System-on-chip (SOC) or the like, there is also an embodiment that uses a processor realized by a single IC chip to function as an overall system including plural hardware resources for executing the specific processing. Adopting such an approach means that the specific processing is realized using one or more of the various processors described above as hardware resource.

Furthermore, more specifically, an electrical circuit that combines circuit elements such as semiconductor elements or the like may be employed as a hardware structure of these various processors. The specific processing is merely an example thereof. This means that obviously redundant steps may be omitted, new steps may be added, and the processing sequence may be swapped around within a range not departing from the spirit of the present disclosure.

The described content and drawing content illustrated above are a detailed description of parts according to the present disclosure, and are merely examples of the present disclosure. For example, description related to the above configuration, function, operation, and advantageous effects is a description related to examples of the configuration, function, operation, and advantageous effects of parts according to the present disclosure. This means that obviously redundant parts may be eliminated, new elements may be added, and switching around may be performed on the described content and drawing content illustrated above within a range not departing from the spirit of the present disclosure. Moreover, to avoid misunderstanding and to facilitate understanding of parts according to the present disclosure, description related to common knowledge in the art and the like not particularly needing description to enable implementation of the present disclosure is omitted in the described content and drawing content illustrated as described above.

All publications, patent applications and technical standards mentioned in the present specification are incorporated by reference in the present specification to the same extent as if each individual publication, patent application, or technical standard was specifically and individually indicated to be incorporated by reference.

Note that, regarding the above description, the following supplementary notes are further disclosed.

Example 1

(Supplementary 1)

A system comprising a processor, wherein the processor is configured to acquire solar position information, acquire radiation intensity information, acquire weather information, acquire airflow velocity information, receive the information acquired by each of the acquisition steps and store the information set in a storage medium, perform optimization processing on the information set using an information processing device, generate a control instruction to optimally control a physical structure of a power generation apparatus based on results of the analysis, activate a driving unit of the power generation apparatus based on the control instruction, and continuously monitor an operational status of the power generation apparatus and notify a user via a communication medium when an abnormality occurs.

(Supplementary 2)

The system according to supplementary 1, wherein the processor is configured to use an analytical model utilizing machine learning or deep learning to calculate the posture of the physical structure of the power generation apparatus.

(Supplementary 3)

The system according to supplementary 1, wherein the processor is configured to generate a protection instruction to move the physical structure of the power generation apparatus to a safety position when the airflow velocity information or weather information included in the information set exceeds a predetermined threshold.

Application Example 1

(Supplementary 1)

A system comprising a processor, wherein the processor is configured to:

receive data from one or more information acquisition devices configured to measure the angle of an energy source, the intensity of radiation, the state of an environment, and the velocity of airflow;

aggregate and preprocess the received data by correcting for missing values or abnormal values;

analyze the preprocessed data using an artificial intelligence analysis module;

generate control information for adjusting the orientation and surface area of a power generation element based on the results of the artificial intelligence analysis module and a user state evaluation module;

control a drive device to physically adjust components of the power generation element according to the control information;

communicate the state or abnormality of the power generation element via visual or audio notification to an external electronic device or information terminal;

receive and process input from the information terminal for manually controlling the physical components of the power generation element according to a user request;

and generate user emotion estimation information by analyzing user expressions or voice using the user state evaluation module.

(Supplementary 2)

The system according to supplementary 1, wherein the processor is configured to perform optimization processing of the orientation and surface area of the power generation element using a machine learning algorithm by the artificial intelligence analysis module.

(Supplementary 3)

The system according to supplementary 1, wherein the processor is configured to generate protection control information for setting the physical components of the power generation element to a safety configuration in accordance with predetermined environmental state or airflow velocity.

Example 2

(Supplementary 1)

A system comprising a processor, wherein the processor is configured to obtain solar position information using an information acquisition unit, obtain solar radiation information using an information acquisition unit, obtain meteorological information using an information acquisition unit, obtain gas flow velocity information using an information acquisition unit, obtain user status information using an information acquisition unit, receive data from each information acquisition unit and perform preprocessing on the data, analyze the preprocessed data and calculate optimization information using an information analysis unit, generate control instructions for controlling operation of a power generation device component based on the optimization information, physically adjust the power generation device component according to the control instructions, continuously monitor the state of the power generation device component, and notify the user when an abnormality is detected.

(Supplementary 2)

The system according to supplementary 1, wherein the processor is configured to use a machine learning model in the information analysis unit to calculate optimal operation parameters for the power generation device component, and to generate control instructions in consideration of the user status information.

(Supplementary 3)

The system according to supplementary 1, wherein the processor is configured to move the power generation device component to a horizontal position when the gas flow velocity exceeds a predetermined value, and to adjust the content or timing of the notification to the user when the user status information indicates a high-stress state.

Application Example 2

(Supplementary 1)

A system comprising a processor, wherein the processor is configured to acquire solar position information via an information acquisition device, acquire radiant light intensity information via an information acquisition device, acquire meteorological condition information via an information acquisition device, acquire atmospheric flow velocity information via an information acquisition device, acquire facility internal power consumption information via an information acquisition device, recognize subject emotional state using a motion detection device and an acoustic acquisition device, receive output information from the information acquisition devices and detection devices and integrate and preprocess the information, analyze the preprocessed information using a machine learning model to determine optimum configuration for the arrangement and operation state of a power generation apparatus element, energy consumption pattern of the facility, and work environment elements, generate control information based on the analysis, automatically control the power generation apparatus elements and facility equipment based on the control information, and monitor current system state and output an alert upon detection of an abnormality.

(Supplementary 2)

The system according to supplementary 1, wherein the processor is configured to generate an input sentence for a general-purpose generative machine learning model and to calculate setting values for the power generation apparatus elements and work environment elements of the facility based on analysis results.

(Supplementary 3)

The system according to supplementary 1, wherein the processor is configured to execute control for switching the power generation apparatus elements and facility work environment elements to a safe operating state and output an alarm upon detection of an abnormal environmental state or emotional state.

What is claimed is:

1. A system comprising a processor that is configured to:

measure an angle of the sun;

measure a light intensity;

acquire weather information;

measure a wind speed;

receive first data obtained from the foregoing measurements and acquisitions, and second data including user-related data from a user terminal, and analyze the first data and the second data using an artificial intelligence to estimate an emotional state of a user and determine, based on the first data and the estimated emotional state, control parameters including an orientation of a solar panel, an angle of the solar panel, and an effective surface area of the solar panel that is available for sunlight collection, and notifications to be sent to the user;

generate a control command to adjust the orientation, the angle, and the effective surface area of the solar panel based on a result of analyzing the first data and the second data so as to increase power generation efficiency while maintaining a safe operating state of the solar panel;

and physically adjust the solar panel based on the control command, wherein when the estimated emotional state indicates that the user is stressed, the processor is configured to at least one of:

(a) reduce a frequency of the notifications to be sent to the user, and (b) delay execution of non-critical physical adjustment of the solar panel while maintaining the safe operating state.

2. The system according to claim 1, wherein the processor generates a protection command to move the solar panel to a horizontal position in case of strong wind and to a vertical position in case of snowfall in generating the control command.

3. The system according to claim 1, wherein the user-related data includes at least one of facial image data and voice data obtained from the user terminal and the processor receives the facial image data and the voice data and outputs user emotion estimation information used in analysis of the second data by the artificial intelligence.

4. The system according to claim 1, wherein the processor generates a protection command as part of the control command to move the solar panel to a predetermined safe position based on weather information and wind speed.

5. The system according to claim 1, wherein the processor monitors an operational status of the solar panel after physical adjustment of the solar panel, detects an abnormality based on feedback from the solar panel, and notifies the user via a visual or audio notification when the abnormality occurs.

6. The system according to claim 1, wherein the user terminal is configured to allow the user to input a manual override command via at least one of voice input and gesture input, and the processor is configured to receive and validate the manual override command and to modify the control command for the solar panel in accordance with safety protocols.

\* \* \* \* \*